United States Patent
Ko et al.

(10) Patent No.: US 7,360,638 B2
(45) Date of Patent: Apr. 22, 2008

(54) INTEGRATED CONTROL CARD FOR CONVEYING SYSTEMS

(75) Inventors: Clyde Miin-Arng Ko, Ada, MI (US); Randall J Carlson, Grand Rapids, MI (US); Roger L Sinen, Grand Rapids, MI (US); Thomas H Triesenberg, Rockford, MI (US); Donald E Lemke, Sparta, MI (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/196,884

(22) Filed: Aug. 4, 2005

(65) Prior Publication Data

US 2006/0030968 A1    Feb. 9, 2006

Related U.S. Application Data

(60) Provisional application No. 60/522,029, filed on Aug. 4, 2004, provisional application No. 60/663,038, filed on Mar. 18, 2005.

(51) Int. Cl.
*B65G 43/10*   (2006.01)
*B65G 13/06*   (2006.01)
*G06F 17/00*   (2006.01)

(52) U.S. Cl. .............. 198/575; 198/781.03; 700/230
(58) Field of Classification Search ........... 198/781.03, 198/781.05, 783, 790, 792, 575, 576
See application file for complete search history.

(56) References Cited

U.S. PATENT DOCUMENTS

| | | | |
|---|---|---|---|
| 5,582,286 A * | 12/1996 | Kalm et al. ............ | 198/781.06 |
| 5,975,736 A | 11/1999 | Simmons et al. | |
| 6,240,335 B1 * | 5/2001 | Wehrung et al. ............ | 700/230 |
| 6,253,906 B1 * | 7/2001 | Hall ......................... | 198/460.1 |
| 6,256,544 B1 | 7/2001 | Weissinger | |
| 6,460,683 B1 * | 10/2002 | Pfeiffer ..................... | 198/460.1 |

(Continued)

FOREIGN PATENT DOCUMENTS

EP    0 909 927 A2    4/1999

(Continued)

OTHER PUBLICATIONS

International Search Report (Form PCT/ISA/210) from corresponding Patent Cooperation Treaty Application No. PCT/US2005/027650, dated Nov. 14, 2005.

(Continued)

*Primary Examiner*—Gene O. Crawford
*Assistant Examiner*—Ramya G. Prakasam

(57) ABSTRACT

A material handling system, and method of controlling the material handling system, includes a conveying surface with a plurality of individually controlled zones and a plurality of motors. At least one of the motors propelling the conveying surface at each zone. A plurality of motor controller circuits adapted to control the plurality of motors. An upper-level control circuit in communication with the plurality of motor controller circuits and adapted to send communications to the motor controller circuits for controlling at least one motor. An integrated control card defining the upper-level control circuit and the plurality of motor controller circuits, wherein the upper-level control circuit and the plurality of motor controller circuits are integrated onto the integrated control card.

21 Claims, 15 Drawing Sheets

U.S. PATENT DOCUMENTS

| | | | |
|---|---|---|---|
| 6,729,463 B2 * | 5/2004 | Pfeiffer | 198/460.1 |
| 6,731,094 B1 | 5/2004 | Itoh et al. | |
| 6,850,021 B1 | 2/2005 | Golownia et al. | |
| 6,959,804 B2 * | 11/2005 | Helgerson et al. | 198/805 |
| 2003/0209410 A1 * | 11/2003 | Itoh et al. | 198/781.05 |
| 2005/0024010 A1 | 2/2005 | Tachibana | |

FOREIGN PATENT DOCUMENTS

| | | |
|---|---|---|
| EP | 0 936 729 A1 | 8/1999 |
| EP | 1 361 182 B1 | 12/2005 |
| WO | WO 02/099549 A2 | 12/2002 |

OTHER PUBLICATIONS

"Universal Stepper Motor Controller," IBM Technical Disclosure Bulletin, IBM Corp., New York, U.S., vol. 37, No. 04A, Apr. 1994, pp. 311-313.

"Closed Loop Brushless Motor Adapter," MC33039, NCV33039, Semiconductor Components Industries, LLC, Aug. 2003, Rev. 3, pp. 1-8.

* cited by examiner

INTEGRATED CONTROL CARD FOR CONVEYING SYSTEMS

CROSS REFERENCE TO RELATED APPLICATION

The present application claims priority of U.S. provisional application Ser. No. 60/522,029 filed Aug. 4, 2004, by Ko et al. for INTEGRATED BED CONTROLLER, which is hereby incorporated herein by reference in its entirety. The present application also claims priority to U.S. provisional application Ser. No. 60/663,038 filed Mar. 18, 2005, by Ko et al. for INTEGRATED BED CONTROLLER, which is hereby incorporated herein by reference in its entirety.

BACKGROUND OF THE INVENTION

The present invention relates generally to conveyors, and more particularly controls for electrically operated conveyor beds.

Conveyor systems are used in a wide variety of material handling applications. These includes such things as conveying luggage throughout airports, conveying parcels through transportation terminals, conveying manufactured parts or components throughout factories, conveying inventory, sorting and conveying items to be transported, and various other applications. Such conveying systems may use conveyors having endless belts that are rotated around end rollers to cause the top surface of the belt to move in the direction of conveyance. Such conveying systems alternatively may use conveyors having a series of rollers, selected ones of which are driven to cause articles positioned on the rollers to move in the direction of conveyance. An example of one such roller conveyor is disclosed in U.S. Pat. No. 6,253,909 issued to Kalm et al., entitled MODULAR POWER ROLLER CONVEYOR, the disclosure of which is hereby incorporated herein by reference. Still other types of conveyors may use movable slats to transport articles, as well as other structures.

The installation and commissioning of prior conveying systems has typically been a labor-intensive process. The design and installation of prior conveying systems has often involved a great deal of custom engineering of the system in order to make the system match the physical layout of the customer's site, as well as match the conveying needs of the customer. Such custom engineering not only includes the physical aspects of the individual conveyors making up the system, but also the programming and control logic that is used to control the overall system. In addition to significant amounts of labor, such custom engineering and design requires extra time for the custom-designed parts and system components to be manufactured. The installation of conveying systems has therefore consumed a significant amount of both labor and time, all of which translate into increased costs for the customer of the conveying system. These costs, of course, are desirably reduced.

A powered roller conveyor surface includes conveyor bed sections divided into conveyor zones. Each conveyor zone may be propelled by a powered roller having an internally mounted motor for rotating that roller. This is known as a motorized roller or powered roller. Currently, the supplier of the powered rollers supplies a motor controller for each powered roller, utilizing their own controller card to handle motor communication. Generally, these motor controllers are off-the-shelf controller products, which are compatible with the powered roller. The motor controller may possess networking and diagnostic capabilities.

As noted above, one of the labor-intensive processes has been installation of controls for the conveying system. Controls may include a logic controller and a motor controller. Currently, a motor controller is connected to and controls operation of a powered roller. Generally, one powered roller is present per conveyor zone and powers the plurality of rollers in the respective zone.

FIG. 1 provides an illustration of a conventional conveying control system 10 which includes a logic controller 20 connected to and controlling a plurality of brushless motor controllers 18. Each motor controller 18 is connected to and controls an associated brushless motor 12, preferably a 24 VDC brushless motor, which power a plurality of associated passive rollers 14 or slave rollers to form a zone 16 on the conveying surface. The number of slave rollers 14 in a zone is determined by how long the conveyor surface must be to accommodate the product required. The length of zone 16 is determined by the type and size of product that is to be conveyed. Motor controller 18 controls the speed, position and direction of brushless motor 12. Logic controller 20 is connected to a network 22 for communications with other logic controllers 20 and any upper level controllers. Logic controller 20 oversees the operation of a plurality of zones 16. Conventional conveying control system 10 requires wiring 13 between each brushless motor 12 and its associated motor controller 18. Additional wiring 13 is required between each motor controller 18 and logic controller 20 of conveying system 10. Currently, an electrician would wire connections between each brushless motor powered roller 12 and motor controller 18. The electrician would then connect wire 13 between each motor controller 18 to logic controller 20.

The use of powered rollers in material handling systems provides the use of power rollers and the material handling system provides the ability to accumulate in a non-touch mode where the product or containers that are moved on the conveyor and do not touch or provide during the accumulation process. Additionally, powered roller systems provide benefits such as running only when required to save energy and bear on the bearings of rollers 12, improved control over each zone in the system, lower noise levels, and improved safety from low voltage. Each brushless motor powered roller 12 may include motor cartridge (not shown) internal to a roller for propelling the respective roller either directly or through a gear reducer. Examples of such powered roller conveyor are disclosed in commonly assigned U.S. Pat. No. 6,253,909 issued to Kalm et al., entitled MODULAR POWER ROLLER CONVEYOR and U.S. Pat. No. 7,035,714 issued to Anderson et al., entitled INTEGRATED CONVEYOR BED, the disclosures of which are hereby incorporated herein by reference. As is known, such powered rollers 12 are available from numerous sources. The electrical interface to a powered roller 12 from one manufacturer is often different from the electrical interface of a powered roller from a different manufacturer.

Motorized rollers 12 are brushless motor powered rollers preferably, although not necessarily, constructed to contain all of the motor components within the roller itself. Examples of these types of motorized rollers are disclosed in U.S. Pat. No. 5,088,596, entitled MOTORIZED CONVEYOR ROLLER issued to Agnoff and U.S. Pat. No. 4,121,127, entitled EXTERNAL-ROTOR TYPE DRUM MOTOR issued to Adelski et al., the disclosures of which are both hereby incorporated herein by reference. Any type of motorized roller 12 may be used in the present invention. Motorized roller 12 may advantageously be a 48-volt motorized roller. 48-volt motorized rollers provide more power than conventional 24-volt motorized rollers. Motorized roller 12 may also include braking type rollers. Motorized rollers 12 may be 48-volt, direct drive motorized rollers of the type disclosed in commonly assigned German Patent Application Serial No. 10324664.9 filed May 30, 2003, entitled ROLLERS AND ROLLER MOTORS, the disclosure of which is hereby incorporated herein by reference.

Therefore, it is highly desirable to reduce material costs, the amount of time and labor involved in these tasks.

DETAILED DESCRIPTION OF THE PREFERRED EMBODIMENT

Figure 1:
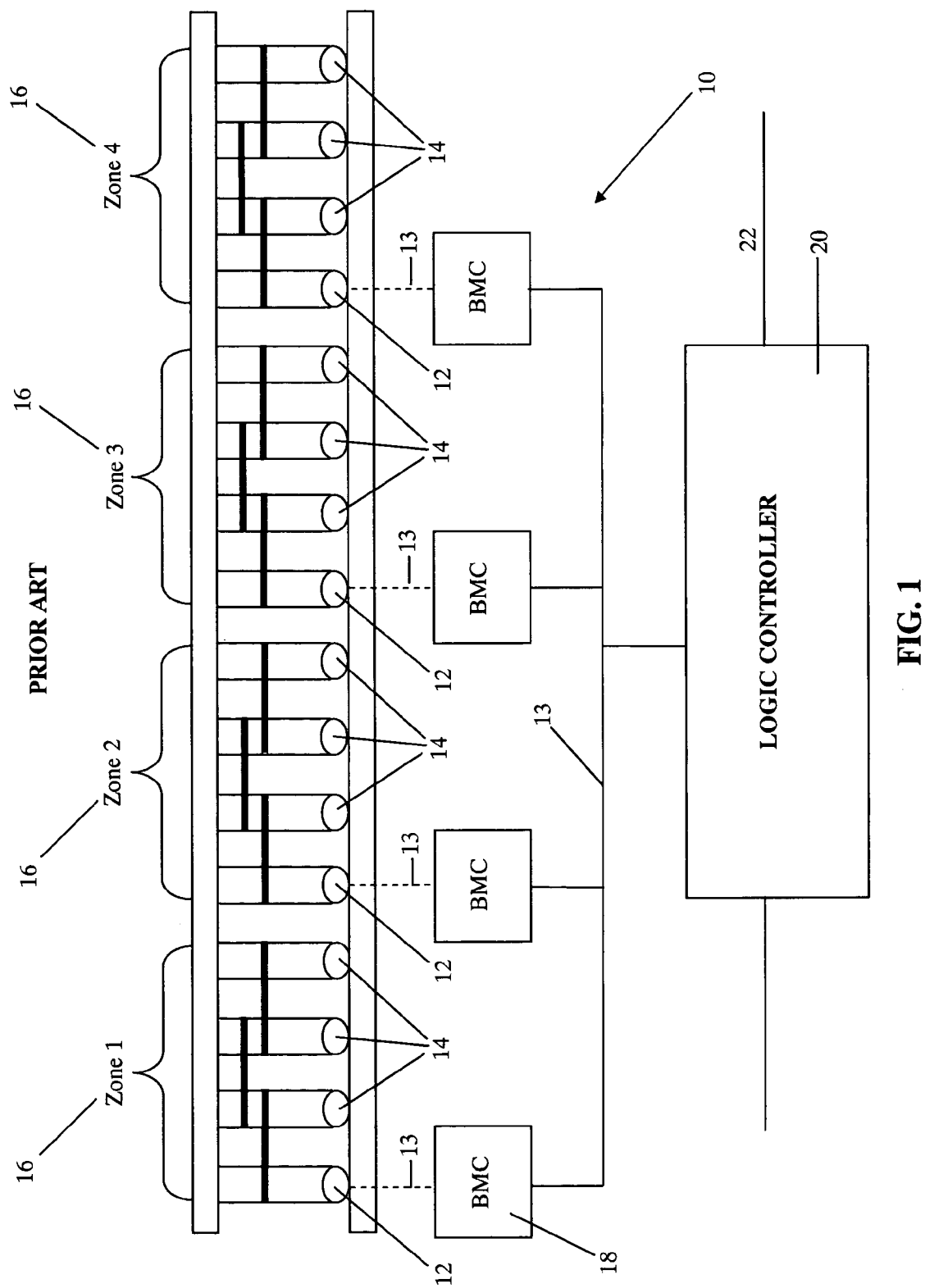
FIG. 1 is a block diagram of a conventional conveying control system.
Figure 2:
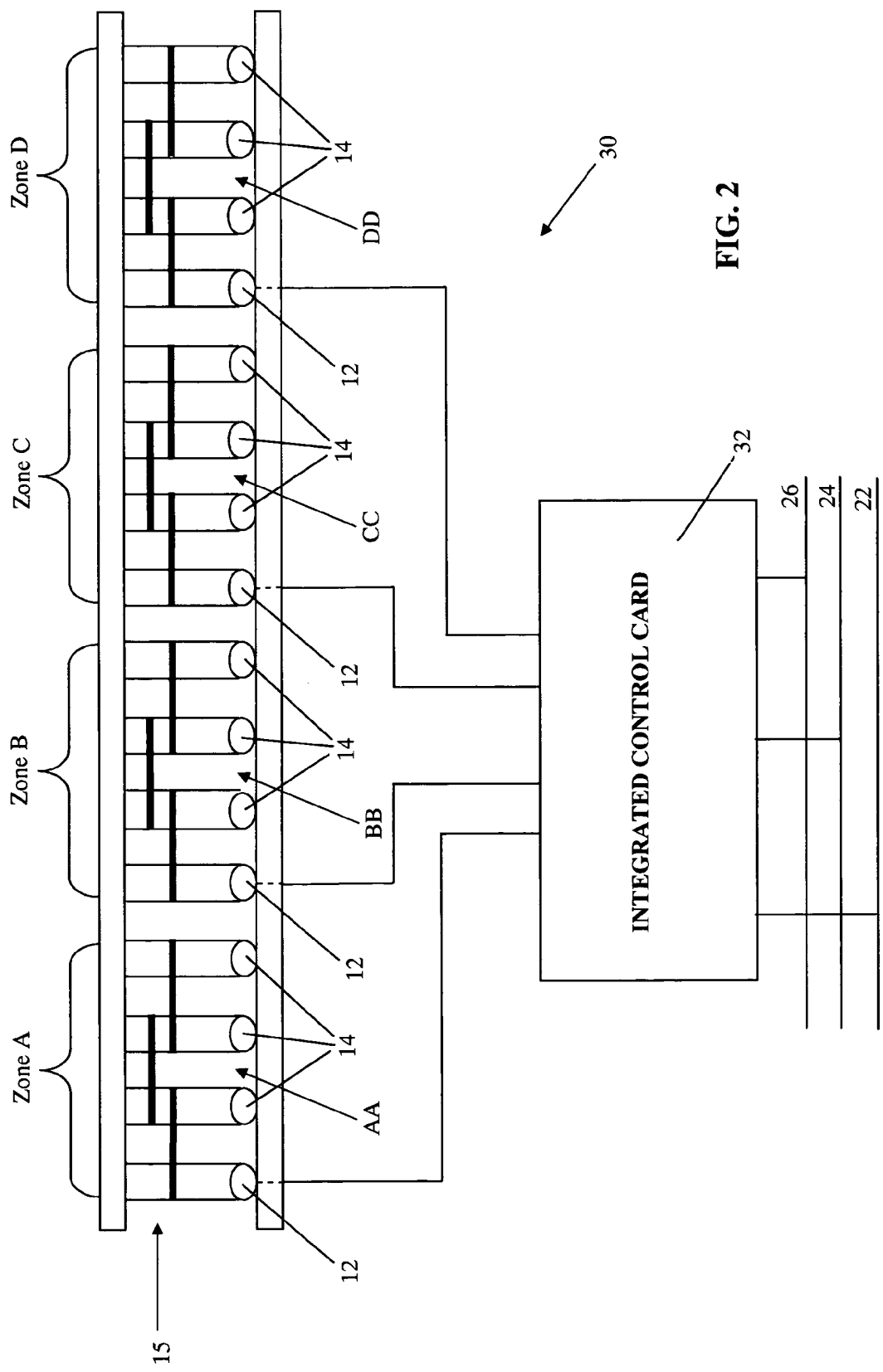
FIG. 2 is a block diagram of a conveying control system, in accordance with the present invention.

Referring now to the drawings and the illustrative embodiments depicted therein, conveying control system 30 of the illustrated embodiment utilizes an integrated control card 32 (FIG. 2). In the illustrative embodiment of FIG. 2, conveying control system 30 is illustrated to include a straight conveyor assembly 15 with four zones A-D, beds or sections, hereinafter "zones", for conveying trays, boxes, or products, hereinafter generally referred to as "trays". It must be appreciated, that the present invention applies to a plurality of conveyor configurations including, but not limited to, curved conveyors, merge conveyors, divert conveyors, or transfer conveyors, which will be discussed in further detail below. Additionally, the present invention may also apply to tray management material handling systems. Such a tray management system is disclosed in commonly assigned U.S. Pat. No. 6,561,339 issued to Olson et al. and entitled AUTOMATIC TRAY HANDLING SYSTEM FOR SORTER, the disclosure of which is hereby incorporated herein by reference. Card 32 provides the functionality and capability of both motor controllers 18 and logic controller 20 of conventional system 10 onto one compact circuit board. Card 32 is designed to control a plurality of powered rollers 12 of each zone. Powered rollers 12 operate only when required with interrelated adjacent zones and communicating with other zones, especially adjacent zones. Zones A-D need to know the status of adjacent upstream and downstream zones to determine whether a tray is in the zone using a sensor and whether to send or hold the tray in each zone.

Figure 4:
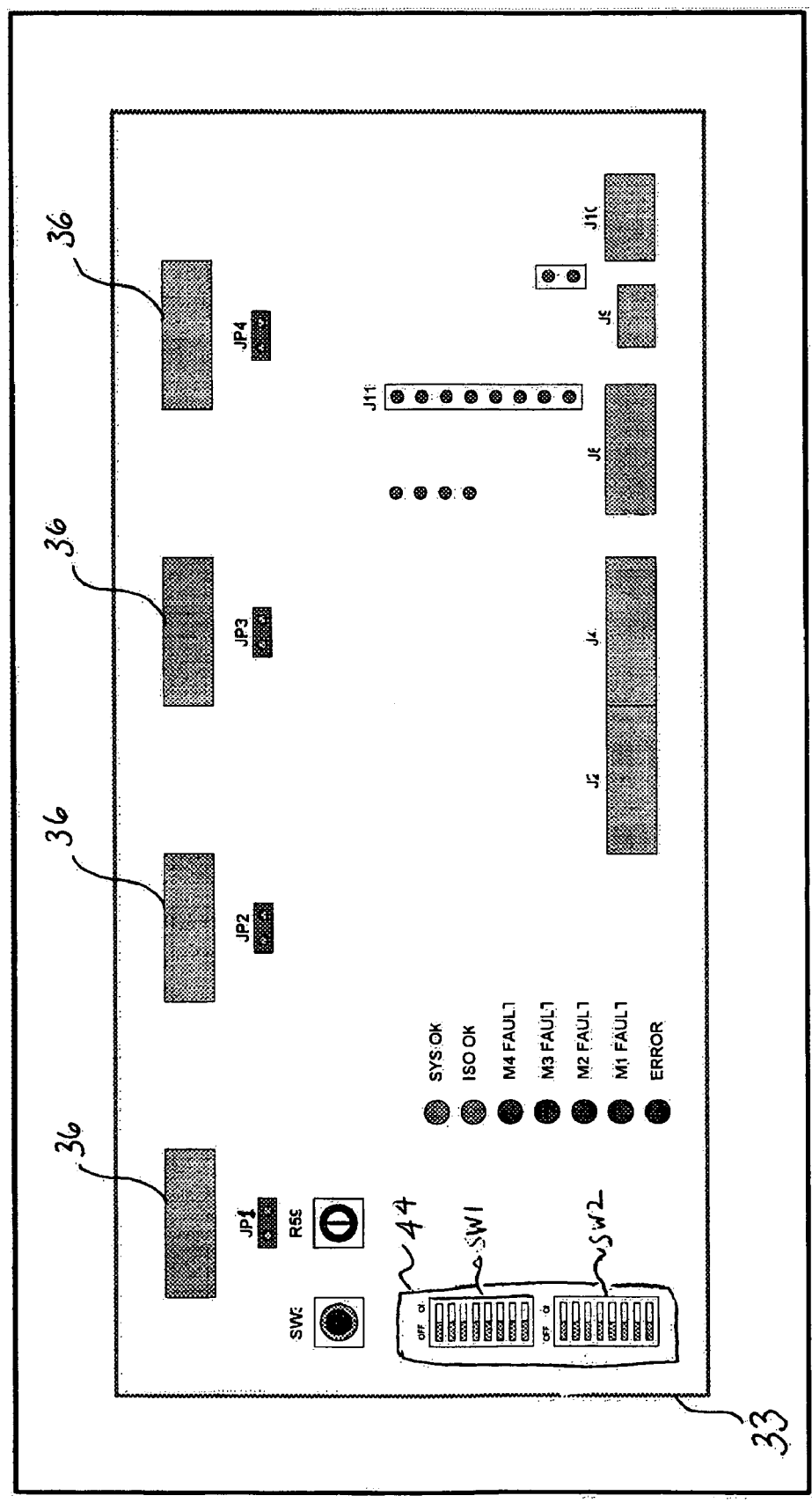
FIGS. 4 and 5 are illustrative schematic block diagrams of an electronic circuit board in accordance with the present invention.

Each zone A-D includes an associated sensor, AA, BB, CC, and DD, powered roller 12 and varying numbers of slave rollers 14, that are typically powered by the powered roller, which are connected to the slave rollers via "O" rings. Sensors AA-DD are preferably photoeye sensors, but may be any mass sensing sensor, proximity sensor, light sensor, or the like. Card 32 is capable of interfacing with a plurality of sensors through connector J4, as illustrated in FIG. 4. The operation of each of the sensor inputs is determined by the purpose of card 32, such as accumulation, merges, diverts or transfers, which is discussed below. Card 32 connects directly to each powered roller 12, which includes a brushless motor. Card 32 may control the speed, direction and/or position of rollers 12 for conveying operations including merges, diverts, and transfers in accordance with a logic program or firewall embedded in logic of microprocessor 34, which is integrated in card 32. It should be noted that in the illustrated embodiment, a plurality of different types of motors and powered rollers 12 may be connected to card 32 for use in a conveying system, as will be discussed in more detail below.

Figure 3:
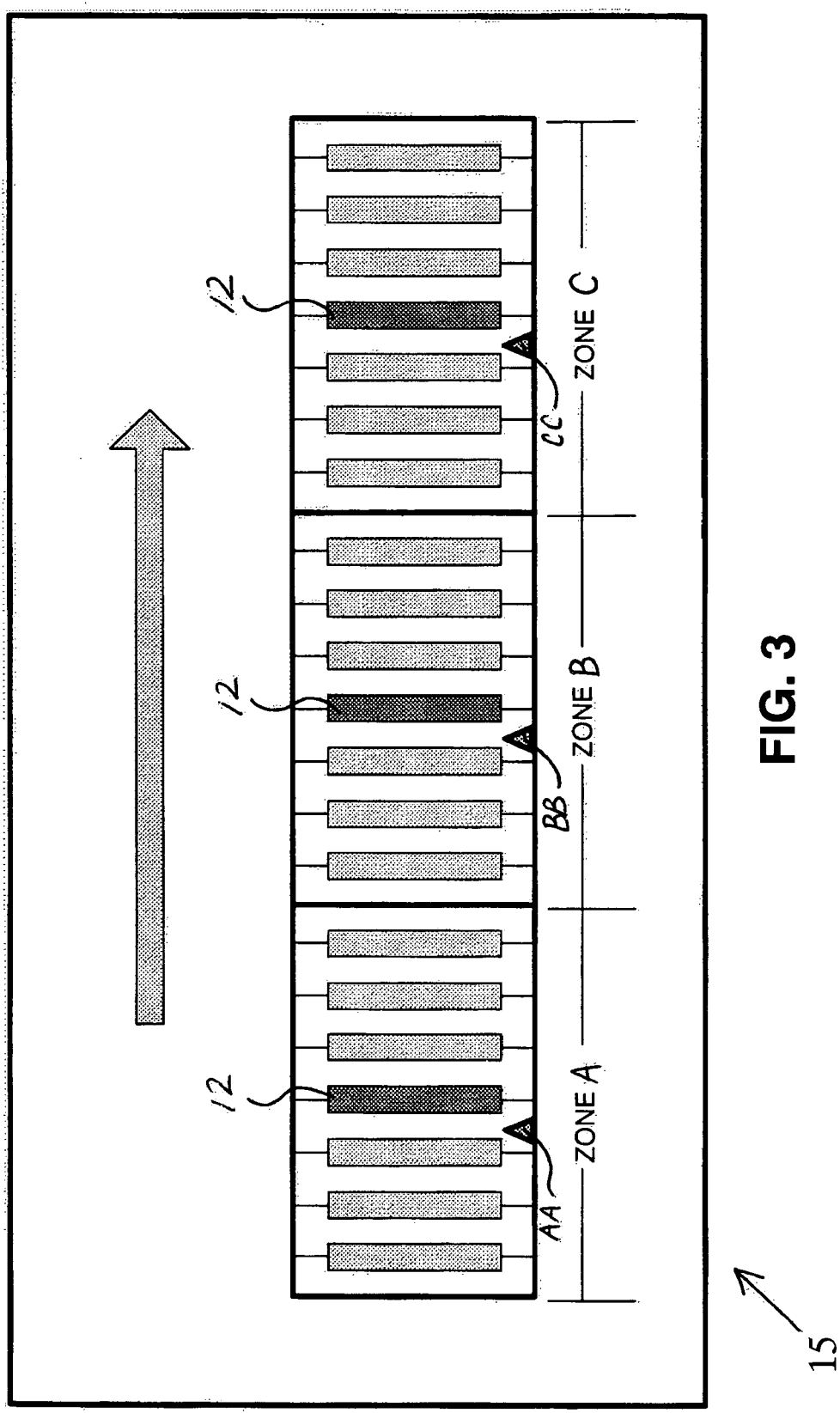
FIG. 3 is a block diagram of a straight zone section of the conveying control system of FIG. 2.

In the illustrative embodiment of FIG. 3, three adjacent zones A-C of straight conveyor 15 are illustrated, with a tray conveyed from upstream zone A to base zone B then to downstream zone C. During typical operation of conveying system 30, zone A is running as a first tray (not illustrated) enters into zone A, a leading edge of the first tray is detected by sensor AA, which is preferably located at the middle of the zone. As the first tray blocks sensor AA in zone A, zone A communicates to zone B the presence of the first tray through card 32. If the conveying surface of zone B includes a second tray, zone B will communicate with zone A to hold the first tray until zone B is cleared of the second tray and can receive the first tray. If zone B is clear when first tray blocks sensor AA for zone A, zone B will start to run and communicate to zone A that it can send the first tray forward. Sensor AA of zone A tracks the first tray until it exits zone A, at which time zone A may stop.

When the first tray reaches sensor BB located in zone B, zone B will communicate to zone C that it has the first tray ready to send to zone C. The process will then be repeated for zones B and C. If zone C cannot send the first tray to the next zone D, the first tray will be accumulated in zone C. If the second tray comes into zone B, it will be held there or accumulated until the first tray on zone C is released. Each zone will run and if the downstream zone is full, when the tray blocks the associated photoeye sensor and powered roller 12 will run or operate for an additional distance, preferably eleven inches, allowing for longer trays to be inducted fully into the zone while shorter trays will not pass the photoeye sensor. It should be noted that the induct distance is variable and settable from card 32 through DeviceNet 22 to accommodate a plurality of tray sizes and configurations. Additionally, card 32 provides a controlled stop or ramp into position to insure the best accuracy.

When any zone A-D is running and expecting to receive tray, that is being tracked, and the tray does not arrive at associated photoeye of that zone in the expected amount of time, an error will be generated by card 32. This error can either be ignored or it can be transmitted via DeviceNet network 22 to the main system monitoring device or upper level controller where it will be displayed and can be acted upon. The expected amount of time to generate an error is preferably 3 seconds, but this amount of time can be adjusted or disabled. If the tray is not being tracked and is removed from the zone, while the zone is running, the zone will cease running when the motor time out time has been achieved. The motor time out may be default timed to 3 seconds, however, this default timing feature can be adjusted over DeviceNet 22.

Figure 5:
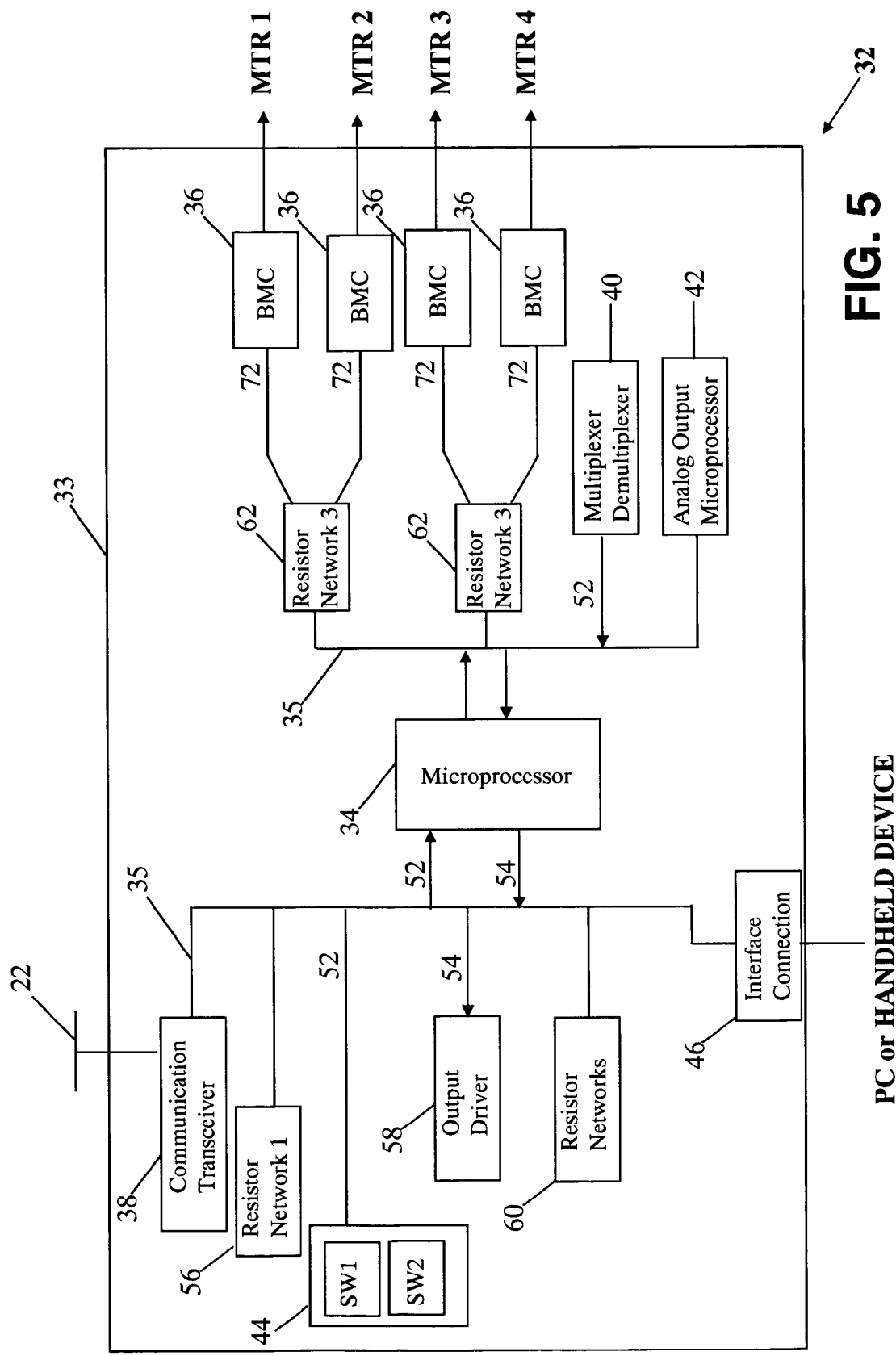
Figure 6:
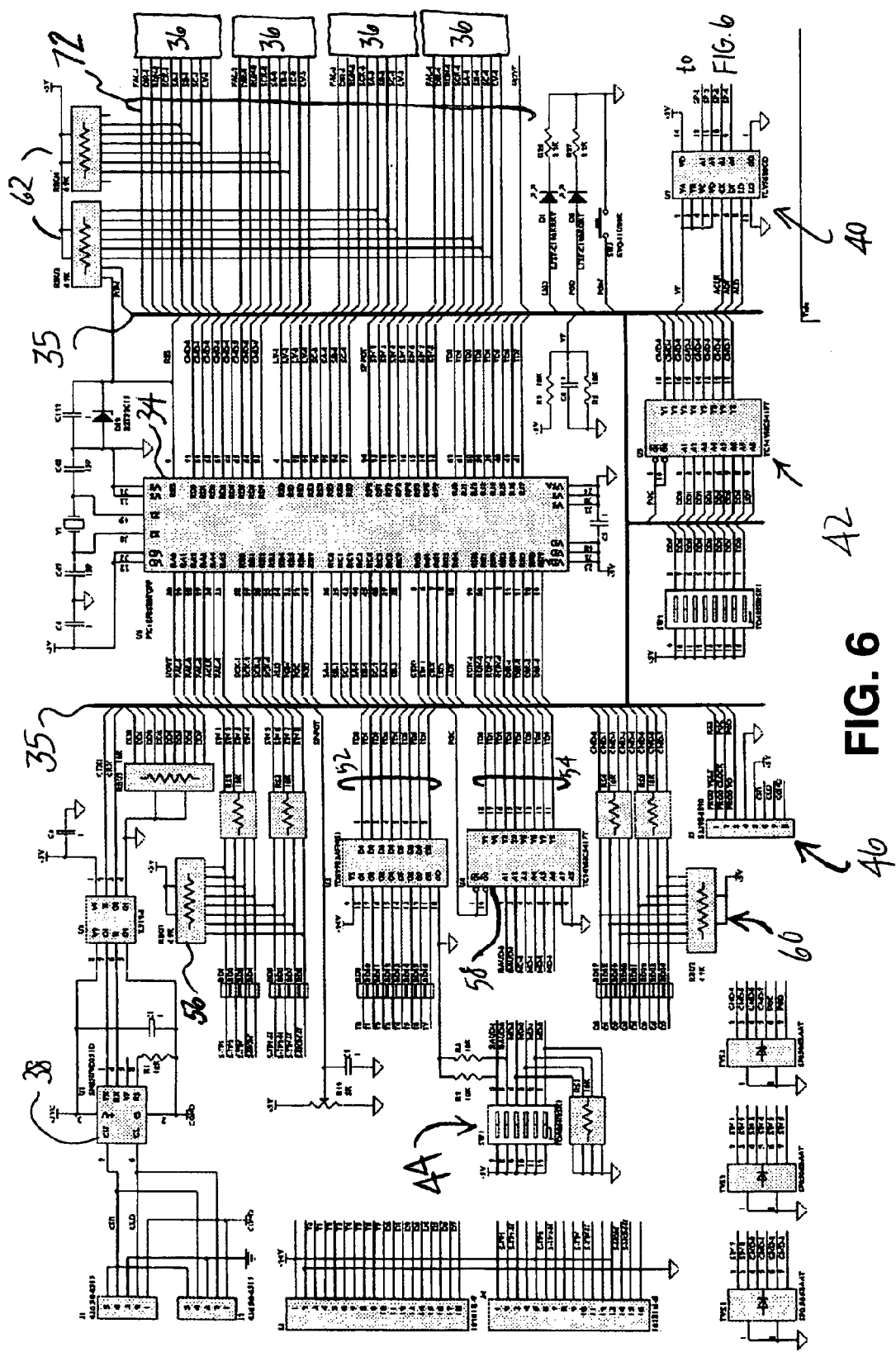
FIG. 6 is an electronic schematic diagram of the circuit board in FIGS. 4 and 5.

Card 32 integrates all the features and functionality of the motor controllers and system controllers of conventional conveying control system 10 onto one integrated card or circuit board (FIGS. 4-6). Card 32 includes a plurality of motor controller circuits 36, designated individually as 36a-36d, illustrated as four controllers in the illustrated embodiments, and a microprocessor or logic controller 34 to control the logic and operation of a multi-zone conveyor merge, transfer or divert as well as the circuitry required for the commutation of powered rollers 12. The combination of motor controllers 36a-3d on one integrated board with logic controller 20 also supports the capability of monitoring the Hall-effect sensors integrated in each powered roller 12. This gives the ability to card 32 to control the speed, direction, and position of powered roller 12, therefore giving limited server capability to the powered motor control, as will be discussed in further detail below. Card 32 is connected to network 22 for communications with other cards 32 or upper level controllers within the network, a motor power supply 24, and a logic power supply 26. Motor power supply 24 and logic power supply 26 are preferably 24 VDC power lines. Network 22 may be a standard and commonly available high-speed serial network, preferably DeviceNet, such as, but not limited to: Ethernet, ControlNet, Firewire, CanOpen, ProfiBus, ProfiNet, CAN, FieldBus, or any other field bus or local area network. Network 22 may optionally include a bridge (not shown) translating between the above different standards and protocols. Card 32 further provides the advantage of eliminating the need for an external signal output terminal if desired. An example of such a network is disclosed in commonly assigned U.S. Pat. No. 7,035,714 entitled INTEGRATED CONVEYOR BED, the disclosure of which is hereby incorporated herein by reference.

Card 32 can operate in a plurality of different modes, including but not limited to, accumulation, jog, singulation, and purge. The operation modes are discussed below in relation to mainly straight and curved conveyor sections. However, these operation modes may be applied to merges, diverts, transfers, and any other types or configurations of material handling systems, while keeping within the scope and spirit of the present invention.

In the accumulation mode, which is generally a normal mode of operation for conveying control system 30, the first tray travels through zones A-D and discharges if no other trays are held up in the conveying control system. Whenever the first tray encounters a zone that holds another tray, the zone with the first tray stops to begin accumulation. When the downstream zone becomes clear, then the zone with the first tray will turn on or activate and move the first tray forward to that downstream zone. The first tray will continue to move until it encounters another full zone and stops.

Card 32 is capable of a plurality of jog control modes. Card 32 communicates with other cards and an upper level controller or a maintenance or overall monitoring system, preferably utilizing DeviceNet network 22. If a jam occurs, the zones controlled by particular card 32 can be individually jogged to try and clear the jam. This same jog operation also allows for the reversing of zones to eliminate jams. If the zones are being monitored from a remote location these operations may be initiated over DeviceNet network 22 from the main control system or upper level controller. Additionally, a single pushbutton may be located on the control board to jog all of the zones controlled by that particular card 32 to move forward in an attempt to clear a jam manually or to determine if the zone is operating properly.

Card 32 may also operate in the purge mode, which releases all of trays on a conveyor line. In the purge mode, all conveyor zones start at the same time, sending a string of trays out of the zone or bed and into the next zone or bed. Card 32 may also operate in a singulation mode by releasing trays from the zone in a single orderly fashion. The tray will release from the zone one at a time and then the next zone will move forward releasing the following tray. The singulation mode is different from the purge mode in that the trays are released one at a time instead of in a continuous line of trays.

Card 32 includes a circuit board 33 receiving a microprocessor 34, one or more integrated motor controller circuits 36, an isolated network transceiver 38, a multiplexer/demultiplexer 40, an analog output microprocessor 42, a set of dip switches 44, and a card interface 46 (FIGS. 4-6). Dip switches 44 are illustrated as two sets of dip switches located on card 32, SW1 and SW2. Dip switch SW1 is used for mode selection in choosing from a plurality of several operating modes. The particular mode for an application is determined by dip switch SW1. An alternative to setting dip switches for the straight or curve section per zone is to auto tune card 32 to the module. Located below SW1 on card 32 is dip switch SW2 which sets the communication node address for the card, preferably an eight position switch that is encoded in a binary format. FIGS. 4-5 may not be representative of the actual layout but provide a representation of the electrical connections between the components and devices on card 32. It must be appreciated that other devices and components related to the control of conveying system 30 may also be integrated onto card 32 and circuit board 33 while keeping with the scope and spirit of the invention. Communications between the components and hardware on circuit board 33 may be accomplished over a conventional circuit board circuitry 35 using any digital circuitry communication means. For example, communications between microprocessor 34 and motor controller circuits 36 may be accomplished using transistor-transistor logic (TTL), which does not require address-based messaging. Alternatively, addresses may be assigned to card 32 without using dip switch SW2 and instead performed through the card using automatic assignment of communication addresses. For example, one such automatic addressing method and system is disclosed in U.S. Pat. No. 7,035, 714 issued to Anderson et al., entitled INTEGRATED CONVEYOR BED, the disclosure of which is hereby incorporated herein by reference. Powered rollers 12 plug into a motor connector 70 on card 32 via a cable and/or a motor connector conversion board 110. Card 32 can operate a plurality of powered rollers 12 with different configurations. Powered rollers 12 of a bed or zone section should be plugged into card 32 in a corresponding manner, starting with the charge end of the conveyor.

Microprocessor 34 performs the functionality of logic controller 20 by controlling conveying systems with logic. The logic may be stored as a program in a plurality of devices and locations, such as in the read/write memory of microprocessor 34, in a separate dedicated read/write memory storage device integrated on card 32, or the read/write memory of another device or component integrated on the card. The logic program may be configured to control the conveying system in a manner required by the application. For example, card 32 may be utilized in a plurality of conveying configurations and applications, including but not limited to: straight conveying sections, curved conveying sections, storage or accumulation conveying sections, right angle transfer sections, precision tote positioning sections, cross-roller sections, incline-decline/brake section, divert sections, merge sections, zero pressure accumulation, and the like. Card 32 may be integrated into a plurality of different types of conveying systems, including but not limited to incline conveyors, extension conveyors, lift gates, divert, or right angled transfers.

Incline conveyor sections operate in a similar manner as a straight conveyor section but incline conveyor sections connect different elevations of conveyors into one section. Generally, incline conveyor sections are capable of conveying trays at an angle ranging from 0 to 22 degrees. In the inclined range from 8 to 22 degrees, a carcass belt with a stiff backing on a slider is preferable. Incline conveyor sections require two powered rollers 12 per zone to compensate for the significant tension and drag on the powered rollers. Powered rollers 12 are preferably connected and run in parallel. In an incline range of 7 degrees and below or with decline conveyor sections, card 32 is configured to operate as a straight section. The brake function on high torque powered rollers may be utilized.

Extension or extendable conveying sections provide adjustable and variable bed lengths, when an odd length gap is required to be filled. Such an extendable conveying section is disclosed in U.S. Pat. No. 6,935,487 issued to Schaum et al., entitled ADJUSTABLE LENGTH CONVEYOR BED, the disclosure of which is hereby incorporated herein by reference. Extension conveying section may include a plurality of zones with at least one zone capable of being extended to the length of one complete zone in increments, preferably 2 inches. Card 32 for extension conveying section is configured as a normal straight multiple zone section unless an additional powered roller is required. This additional powered roller operates in parallel with the previous zone but can be adjusted to have a different speed than the preceding zone.

Card 32 may also control lift gate conveyor sections, which move trays over or through a conveyor with one or more lift sections. During operation, an operator will press a stop button, preferably located by the lift gate, causing the upstream zone of the lift gate section to accumulate and the zone in the gate section to clear. When the trays have cleared from the lift zone, the operator closes the gate. After the gate is closed a proximity switch will sense the closure and allow for the operator to start the conveyor by pressing a start button. In a two gate lift gate or double lift gate section, two single lift gates are used together. Card 32 performs the function indicated by the mode selected by dip switches SW1. The upstream lift gate will have mode dip switches SW1 set as the upstream double lift gate, while the downstream zone will be set to a downstream double gate. This will allow the upstream gate to communicate to the downstream gate to determine if the tray has cleared to control the indicator lights correctly. The upstream zone will be connected to and control the button and indicator lights as mentioned above.

Figure 7:
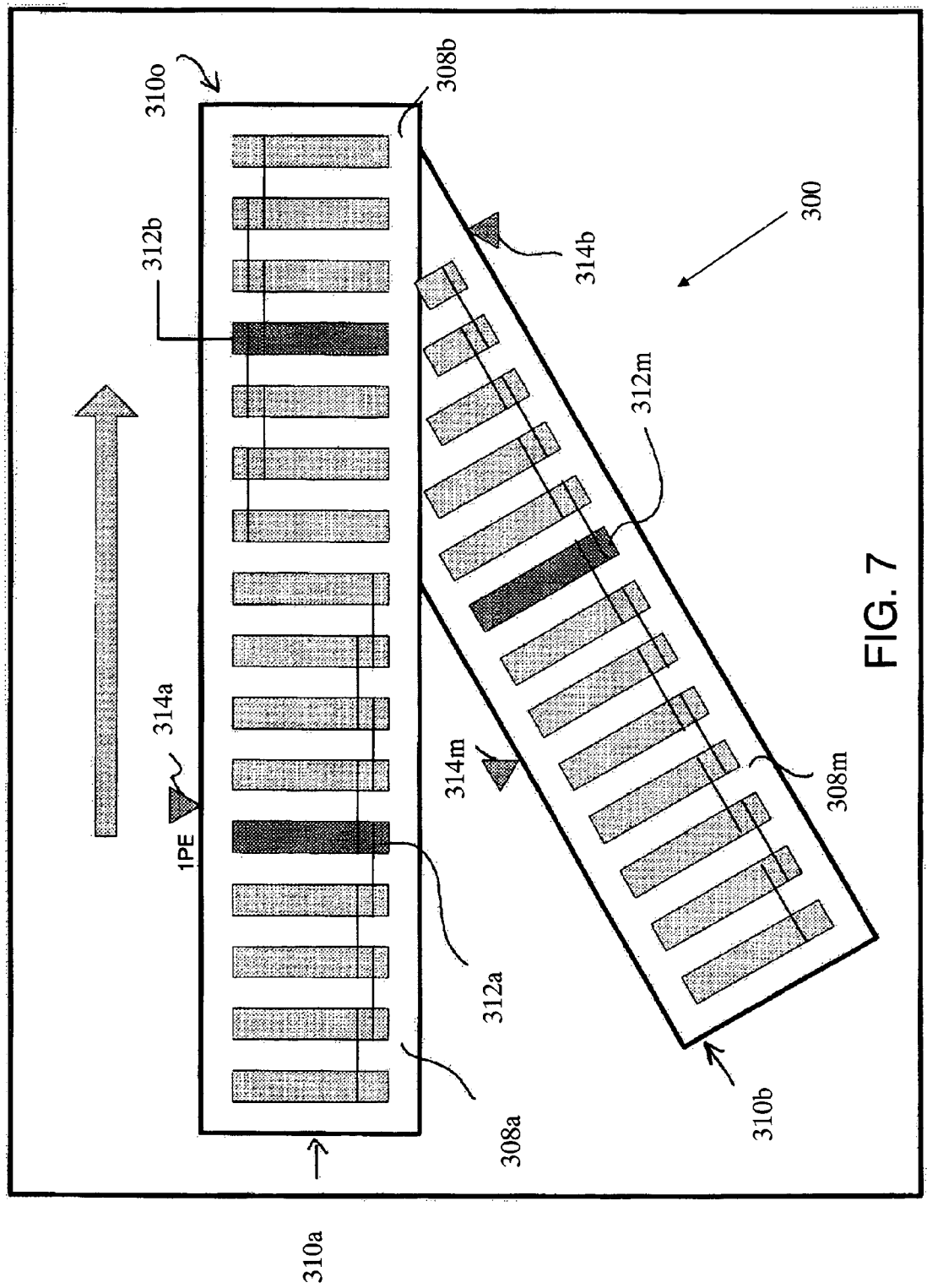
FIG. 7 is a block diagram of a merge conveying system, in accordance with the present invention.

Card 32 may also control merge conveyor sections, which typically include two separate conveyor lines coming together or merging. In the illustrative embodiment of FIG. 7, a 2-to-1 merge conveyor section 300 is illustrated where the trays come into the main line from a bottom right position. However, in keeping with the spirit and scope of the present invention, the merge can come into main line from any direction and can provide a plurality of merges, such as a 3-to-1, and in either a wye or an inline orientation. The present invention contemplates application of card 32 to other orientations including, but not limited to: double wye merges, double inline merges, double inline divert modules, double wye divert modules, and the like. Card 32 controls the merging operation of merge 300 by controlling an infeed motor 312a feeding the merge conveying surface to assure that no collisions take place in the merge area. Card 32 provides three different modes of merges depending on the configuration.

In a first mode or a no-priority merge, trays that enter merge 300 from either Input A, 310a, or Input B, 310b, to have equal priority when being merged to an output line 310o, thus the trays would be released to the output line on a first come first serve or first in first out basis. In this no priority merge mode, photoeye 314a of zone A, 308a, and photoeye 314m of zone M, 308m, govern the operation of merge 300. If photoeye 314a is clear, powered roller 312a associated with zone A will run if the upstream zone is sending a tray. If photoeye 314b is blocked the tray will accumulate on zone A.

If photoeyes 314b and 314m are clear and if a downstream zone is clear, which is controlled by another card, powered roller 312b associated with zone B will run and the tray will be conveyed through zone A and through merge zone B, 308b. When photoeye 314b becomes blocked by the tray, upstream powered roller 312a of zone A will stop unless it is accepting another tray. Powered roller 312b of zone B associated with 314b will continue to run until photoeye 314b becomes clear and the tray has been passed out of the zone.

If photoeye 314a again becomes blocked before a tray blocks photoeye 314m, powered roller 312a of zone A associated with photoeye 314a will continue to run and move the tray forward. If photoeye 314m becomes blocked before photoeye 314a then when photoeye 314b is clear and the downstream conveyor zone is clear powered roller 312m of zone M associated with photoeye 314m will move the tray forward into zone B.

In a second mode, or priority merge, either input line 310a or 310b can be given a priority over the other allowing one of the input lines to have a priority release over the other. This allows for continuous tray release from one line until that line clears and then the other input line would be allowed to release. The line without the priority would continue to release trays until the priority line again receives a tray. The priority line would then again release until no trays are present. This could be required because of density of the tray flow or because of the need to get trays from a particular destination through merge 300 as soon as possible. The main difference in this mode is that if input 310a has the priority and it is releasing a tray and a tray comes into input 310b, if another tray becomes present at input 310a, input 310a will continue to release until no more trays appear. Then input 310b will release its tray or trays until input 310a again has a tray present. Merge 300 will be capable of having either input 310*a* or 310*b* as a priority. The zones that are utilized in merge 300 must be connected to card 32 in the order in which the photoeyes are assigned to the zones. Photoeye 314*a* which corresponds to zone 308*a* would be assigned as motor 312*a*. Photoeye 314*b* for zone 308*b* would be assigned motor 312*b*, and photoeye 314*m* for zone 308*m* would be motor 312*m*.

Figure 8:
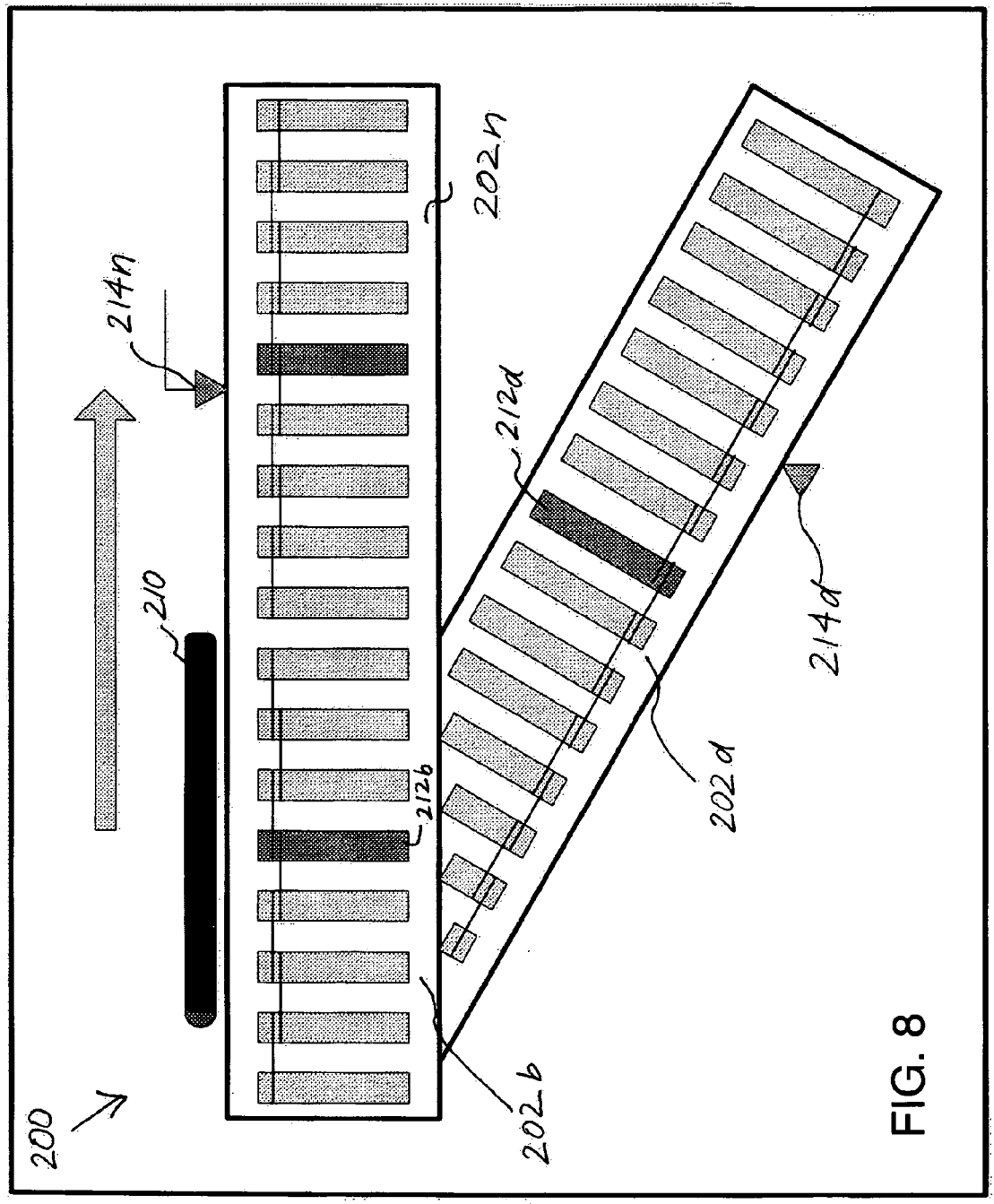
FIG. 8 is a block diagram of a divert conveying system, in accordance with the present invention.

Divert modules systems 200 take trays coming in on a single line and then can either go straight through or can be diverted to another line (FIG. 8). Divert module 200 can be in two configurations: it can divert either right or down as shown in FIG. 8, or it can divert left or up. There can also be a double inline divert or a double wye divert. Data can either be tracked with the tray to a divert point 202 where card 32 receives data requesting the tray to divert or an interface module can be added to the system at the divert point to interface to a bar code scanner (not shown). The scanner can read a barcode label located on the tray and communicate to card 32 that the incoming tray must divert. The trays enter divert module 200 at input point 202 for zone B. Card 32 for divert module 200 communicates to the upstream card module that the zone is clear. The upstream card then communicates that it is sending a tray and if the tray needs to be diverted or not. Powered roller 212*b* of zone B, 202*b* starts running and if the tray needs to be diverted diverter arm 210 moves into position. If the tray isn't to be diverted Zone N, 202*n* will run until the tray blocks photoeye 214*n*.

If the tray is going to be diverted, arm 210 is moved into position and at the same time the signal is sent to divert mechanism, powered roller 212*d* of zone D controlled by photoeye 214*d* will start to run. The tray will then be diverted to zone D, 202*d*. If the downstream conveyor from zone D, 202*d*, is clear the tray will be conveyed to the next conveyor. If the downstream conveyor is not clear the tray will accumulate in zone D, 202*d* in front of photoeye 212*d*. When the tray clears photoeye 212*d* for a given distance to the exit of the spur, powered roller 212*d* will stop. To operate divert module 200, the auxiliary I/O on the module may be required. Zones of divert module 200 must be connected to card 32 as the photoeyes are assigned. The I/O that is required to communicate to divert mechanism 210 would utilize the auxiliary I/O.

Figure 9:
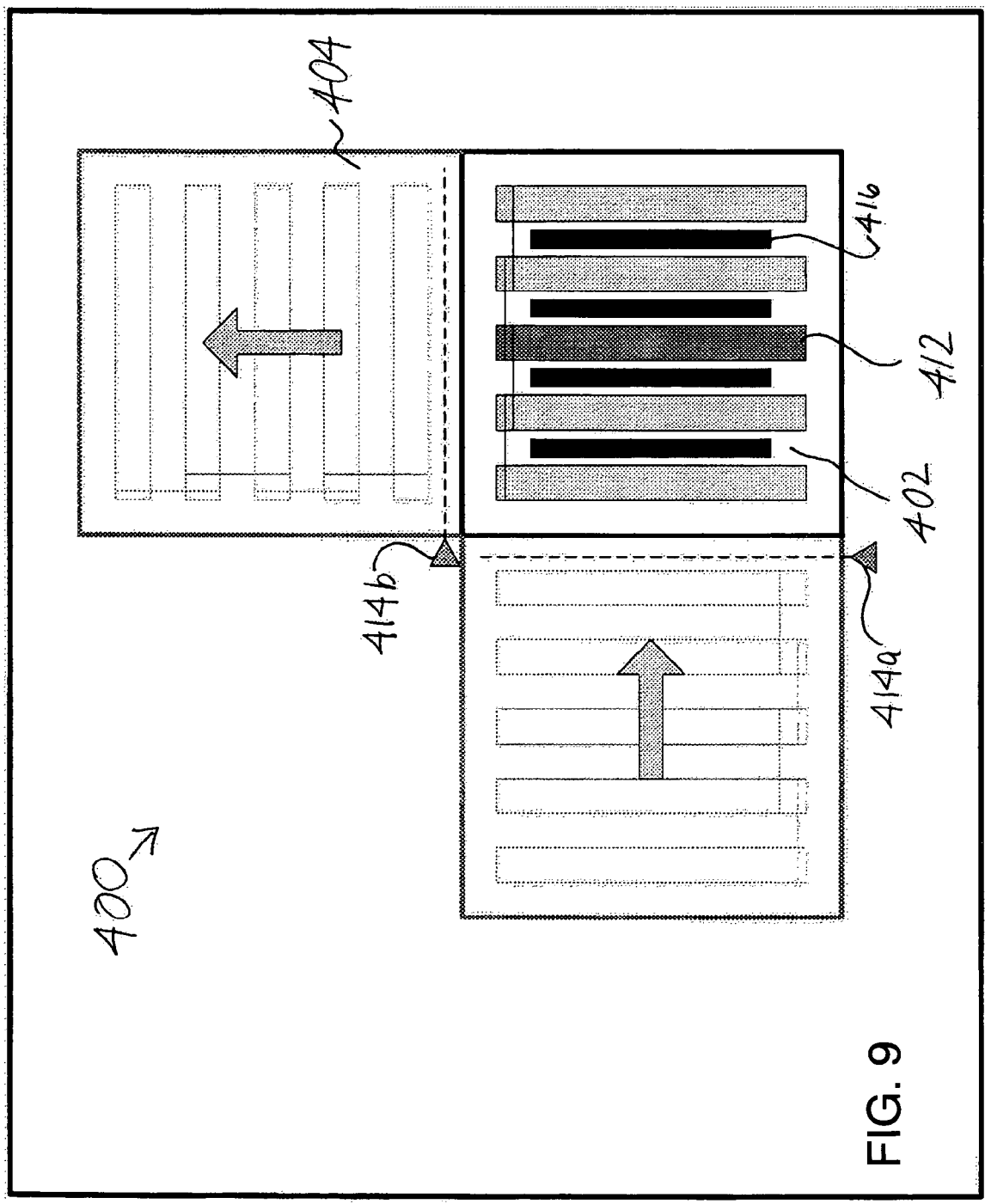
FIG. 9 is a block diagram of a right angle transfer conveying system, in accordance with the present invention.

Card 32 may also control a right angle transfer system 400 for passing a tray through the mechanism to transfer the tray 90 degrees in either the right or left direction (FIG. 9). Right angle transfer 400 can be configured in a plurality of layouts with three exit possibilities. Right angle transfer 400 utilizes a belt/lift mechanism 402 integrated into powered roller conveyor but other transfer mechanisms can be used. Right angle transfer 400 uses a powered roller 416 base lifting mechanism with a separate powered roller driven belt. Transfer requests and error input and output are accessed via network 22, preferably DeviceNet. Card 32 may control a plurality of different configurations for right angle transfer 400, each requiring a different setup for the card. The firmware for each configuration will be resident on the control board and will be selected via dip switches SW1.

Card 32 may control either a right-hand or left-hand corner right angle transfers. A left-hand corner right angle transfer 400 is provided in the illustrative embodiment of FIG. 9, where no master controller is required. Card 32 on corner right angle transfer 400 determines if there is an open position in the direction that the tray needs to go. When there is an open position in the proper direction, card 32 controlling corner right angle transfer 400 will send a message to incoming card that it can send tray forward. Powered roller 412 of corner right angle transfer 400 will then start to run as well as the powered roller on the input zone. If tray is to convey through corner right angle transfer 400 to exit zone 404, right angle transfer 400 will act as a standard accumulation zone. Tray will block and then clear photoeye 414*a* and if zone 404 downstream of right angle transfer 400 is clear, the tray will continue to move until it blocks and clears photoeye 414*b* for a left hand corner. Tray is then under control of downstream card. If downstream card sends a message to right angle transfer card 32 that there is no room in downstream zone 404, tray will be held on corner right angle transfer 400 until there is room to move forward.

Additionally, card 32 may control a lift mechanism 402 by running powered rollers that are connected to cams. These cams raise and lower various quantities of belts that, when run, allow the tray to be moved out of right angle transfer 400. During a cycle, card 32 determines position by reading a proximity switch for each end of lift mechanism 402. Card 32 uses this value as its zero or home state. Card 32 will have a preset value for the distance required to be at the fully raised position. If right angle transfer 400 were to lose power during a cycle, card 32 will run an initialization sequence to determine lift position and tray presence. Upon power up card will check to see if the photoeye 414*a* or photoeye 414*b* is blocked. If input photoeye 414*a* is blocked, card 32 will communicate to the upstream card requesting it to run. Right angle transfer rollers will run for a predetermined distance after the trailing edge of the tray is detected by photoeye 414*a*.

If the exit photoeye 414*b* is blocked, card 32 will determine lift 402 position by lowering the lift until the proximity switches are tripped. Card 32 will then run lift 402 to the raised position and will communicate to the downstream card requesting it to run. Upon a clear to send signal from the downstream card, the right angle transfer card will run the belt transfer. If both photoeyes 414*a* and 414*b* are blocked upon power up right angle transfer 400 will attempt to transfer the tray exiting first and then induct the entering tray. It should be noted that this is not normal since a tray should have exited before another one is inducted. Therefore, a jam condition will most likely be set.

Figure 10:
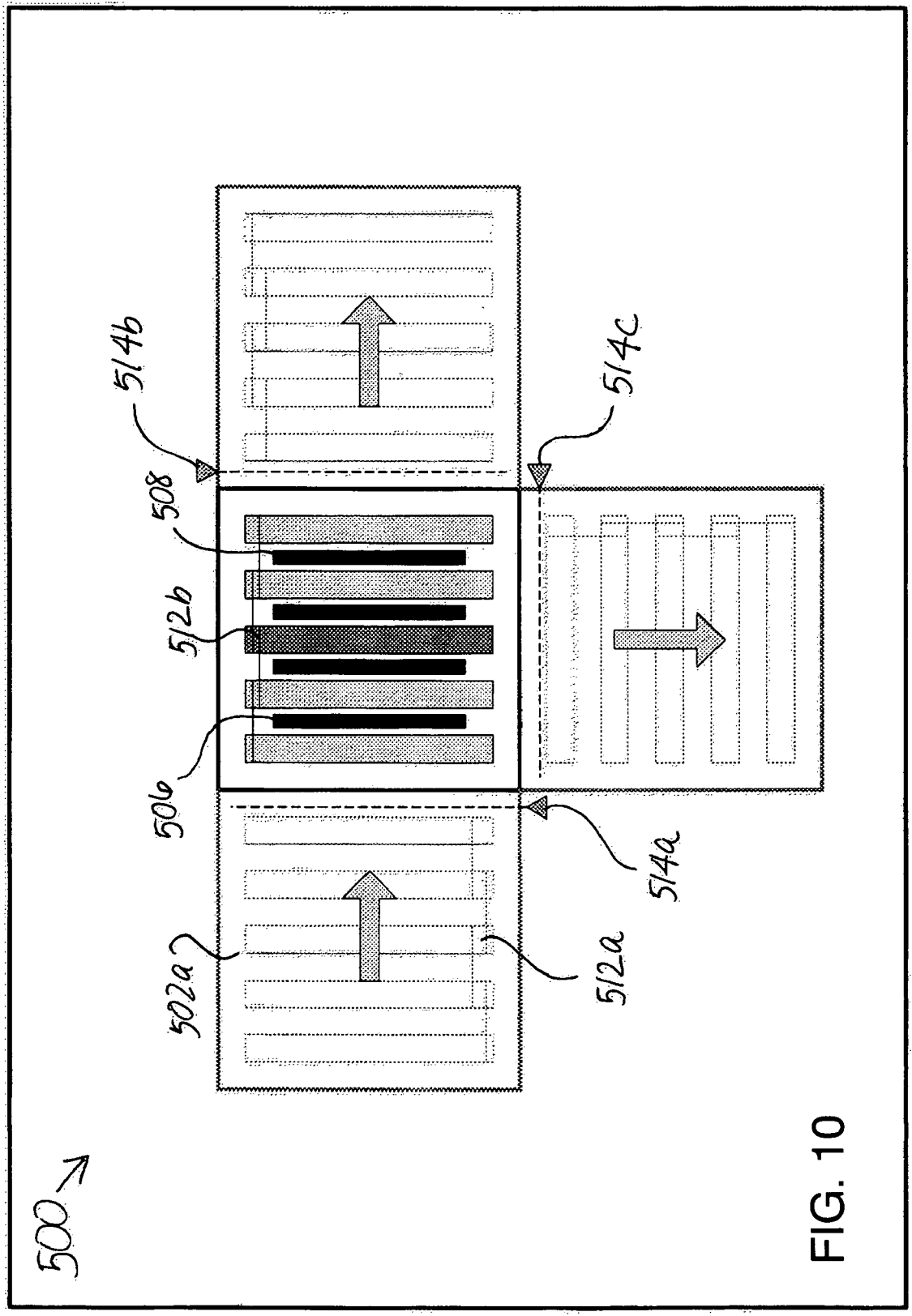
FIG. 10 is a block diagram of a tee-shaped right angle transfer conveying system, in accordance with the present invention.

Card 32 may also control a "T-shaped", "tee-shaped" or "4-way" right angle transfer 500 with upper level controller or master control or via mode dipswitches, illustrated in FIG. 10. Right angle transfer may receive instruction from the upper level controller as to if the tray must be transferred left, right, or straight depending upon the mechanical configuration. However, there may be instances when no upper level controller exists and right angle transfer 500 is to be "defaulted" to a certain direction. This being the case, the operator will set the appropriate mode dip switches SW1 to allow for predetermined operation.

Card 32 of "tee-shaped" right angle transfer 500 determines if there is an open position in the direction that the tray needs to go. When there is an open position in the proper direction, card 32 controlling right angle transfer 500 will send a message to incoming card that it can send tray forward. Powered roller 512*a* on input zone 502*a* will then start to run as well as the powered roller 512*b* on right angle transfer. If the tray is to convey through right angle transfer 500 to the exit zone, the right angle transfer will act as a standard accumulation zone. The tray will block and then clear photoeye 514*a* and if the straight through zone downstream of right angle transfer 500 is clear, the tray will continue to move until it blocks and clears the exit photoeyes 514*b* and 514*c*. The tray is then under control of the downstream card. If the downstream card sends a message to right angle transfer card 32 that there is no room in the downstream zone, the tray will be held on right angle transfer 500 until there is room to move forward.

If incoming tray to right angle transfer 500 is to be diverted to the right or to the left, when tray clears photoeye 514*a* the zone conveyor on the right angle transfer will stop, holding the tray on the unit, as illustrated in FIG. 9. Card 32 controlling right angle transfer 500 will send a message to card at the accepting conveyor position telling it that a tray is coming. When card 32 at the receiving position sends a message back to the right angle transfer card to send the tray a traversing belt mechanism 506 will then raise and the belts will run in the direction that the tray must traverse. Traversing belt mechanism 506 will run until the tray blocks and clears the appropriate photoeye sensor. When correct photoeye, 514*b* or 514*c*, has transitioned from blocked to clear, a transfer complete message will be generated. Belts 508 will then stop and traversing belt mechanism 506 will lower to accept another tray.

When card 32 controls a left/right discharge "tee-shaped" right angle transfer, traversing belt mechanism 506 must be in the raised position for right angle transfer 500 to receive an incoming tray. If mechanism 506 is in the down position, a jam will occur. When the tray is to be inducted into right angle transfer 500, traversing belt mechanism 506 will run for a predetermined adjustable distance to allow the tray to enter the right angle transfer completely. "Tee-shaped" right angle transfer 500 can also be utilized to justify and/or square the tray by allowing the tray to be driven against the edge of the conveyor. When the tray has entered completely, photoeye 512*a* has been cleared, traversing belt mechanism 506 will lower holding the tray on the unit. Card 32 controlling right angle transfer 500 will send a message to the card at the accepting conveyor position telling it that a tray is coming. When card 32 at the receiving position sends a message back to the right angle transfer card to send the tray, the rollers will run in the direction that the tray must traverse. The associated rollers will run until the tray blocks and clears the appropriate photoeye. When the correct photoeye has transitioned from blocked to clear a transfer complete message will be generated. The rollers will then stop and the traversing belt mechanism 506 will rise to accept another tray.

Microprocessor 34 may communicate with other devices and components of a conveying system, including, but not limited to, photoelectric sensors and bar code readers. Communications between microprocessor 34 and such other devices may be accomplished over network 22 through an isolated communications transceiver 38 of card 32. Transceiver 38 has the capability to transmit and receive communication signals in network 22. Transceiver 38 will actually apply signals onto the network wire and detect signals passing through the wire in the field bus or local area network.

Microprocessor 34 contains logic programs or instructions stored in a read/write memory, such as any type of random access memory (RAM), to control the speed, direction, or position of powered rollers 12 with an analog output microprocessor 42, which sends messages to various devices. Microprocessor 34 may provide additional inputs 52 and outputs 54 to communicate with any of devices or components of conveying system 30. Inputs 52 into microprocessor 34 may include, but are not limited to, heat sink temperatures of conveying system components, status of sensors (such as photo eye sensors and the like), internal motor states and conditions, and interface to non-bussed controllers.

Inputs 52 may be sent to microprocessor 34 from multiplexer/demultiplexer 40, which can combine several signals for transmission over a single medium. Additional inputs 52 may include input signals from other types of sensors or auxiliary devices, such as barcode readers. Microprocessor 34 provides output messages and commands to motor controller circuits 36, which are integrated on card 32.

Dip switches 44 and an interface connection 46 may be integrated on card 32. Dip switches 44 may set either baud rate for communications and/or an address for communications with SW2 and operation mode setting with SW1 on network 22 as illustrated in FIGS. 4 and 5. Interface connection 46 may connect with a personal computer (PC) or handheld device as best shown in FIGS. 5 and 6. The PC or handheld device (not shown) may interface with card 32 via interface connection 46 in addition to other connected cards and upper level controller on network 22. Alternatively, communication addresses may be provided by a higher level control using the principles disclosed in commonly assigned U.S. Pat. No. 7,035,714 entitled INTEGRATED CONVEYOR BED, the disclosure of which is hereby incorporated by reference.

Resistor Network 56 (RN1) may function as pull up or pull down resistors to assist in interfacing with conveying system devices such as a NPN or PNP photoelectric eyes. Output Driver 58 connects to outputs 54 to assist in sending outputs 54 of microprocessor 34. Resistor Network 60 (RN2) may function as pull up or pull down resistors to assist microprocessor 34 in interfacing outputs to external devices or components. Resistor Networks 62 are pull up resistors for the control line to each motor controller for inputs and outputs 72 to each motor controller circuits 36, which are discussed below in greater detail and shown in FIGS. 12 and 13.

Figure 11:
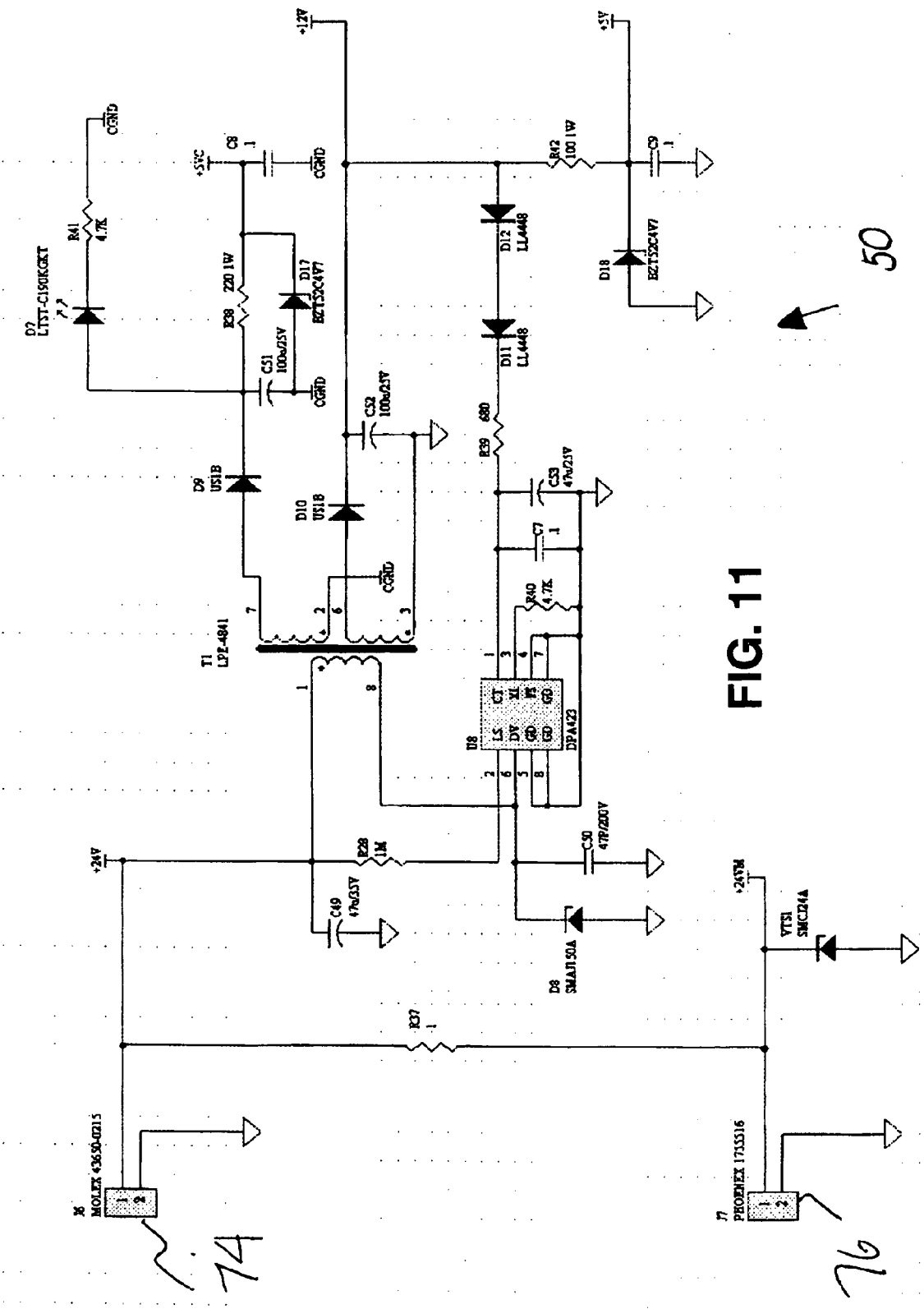
FIG. 11 is a schematic drawing showing an internal power supply which may be integrated with an electronic circuit board.

An integrated power supply 50 may be provided via two connectors J9, J10 (FIG. 3) that is an isolated internal power supply to the electronic devices for the controller via connector J9 and components such as motors via connector J10 integrated on card 32 in accordance with an embodiment (FIG. 11). Power supply 50 may also provide power, such as 24 VDC, to all devices connected to card 32, including, but not limited to, brushless motor powered rollers 12, sensors, and bar code readers. Power supply 50 may have a 24 V input and generate multiple output voltage levels, such as 12 volts, 5 volts and any other isolated voltage requirements for any components on card 32. Power supply 50 may be powered from conventional 120 VAC supply or may also be capable of accommodating other higher or lower input voltages, for example a high voltage three-phase 480-volt power supply. Power supply 50 pulls the required amount of electricity and converts the AC current to DC current. Power supply 50 also regulates the voltage to eliminate spikes and surges to protect devices and components integrated on card 32 and connected to the card. Further, an additional power supply may be integrated on card 32 to supply back-up power in the event of a power loss.

Power supply 50 includes a microprocessor power supply 76 for powering microprocessor 34 and a motor power supply 74 for each motor 12. The circuit for microprocessor power supply 76 and motor power supply 74 are separate in order to protect the memory of microprocessor 34 in the event of a power loss. The memory of microprocessor 34 maintains the status information and addresses of all items and articles on conveying system 30.

Card 32 is also capable of operating high torque powered rollers. To accomplish the increase in torque, four jumpers, JP1 through JP4, are located on card 32 underneath each associated motor connector 70 as shown in FIG. 4. Each jumper corresponds to the motor connector it is located nearest. When there is no jumper in place, the motor will operate in the normal mode. If a jumper is present, the motor will deliver a higher torque.

Figure 12:
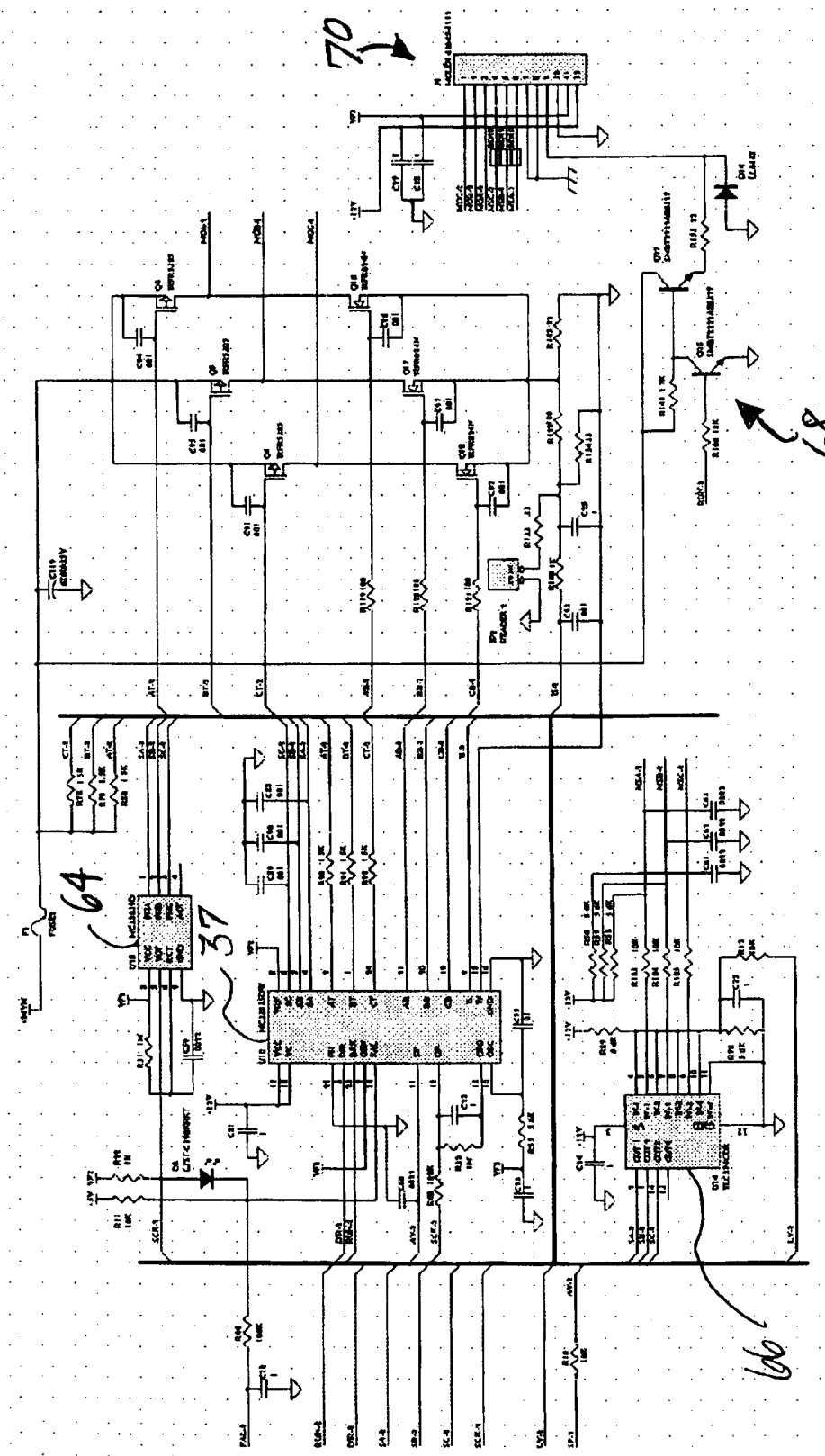
FIG. 12 is a schematic drawing of a motor controller and connector that is integrated with an electronic circuit board.
Figure 13:
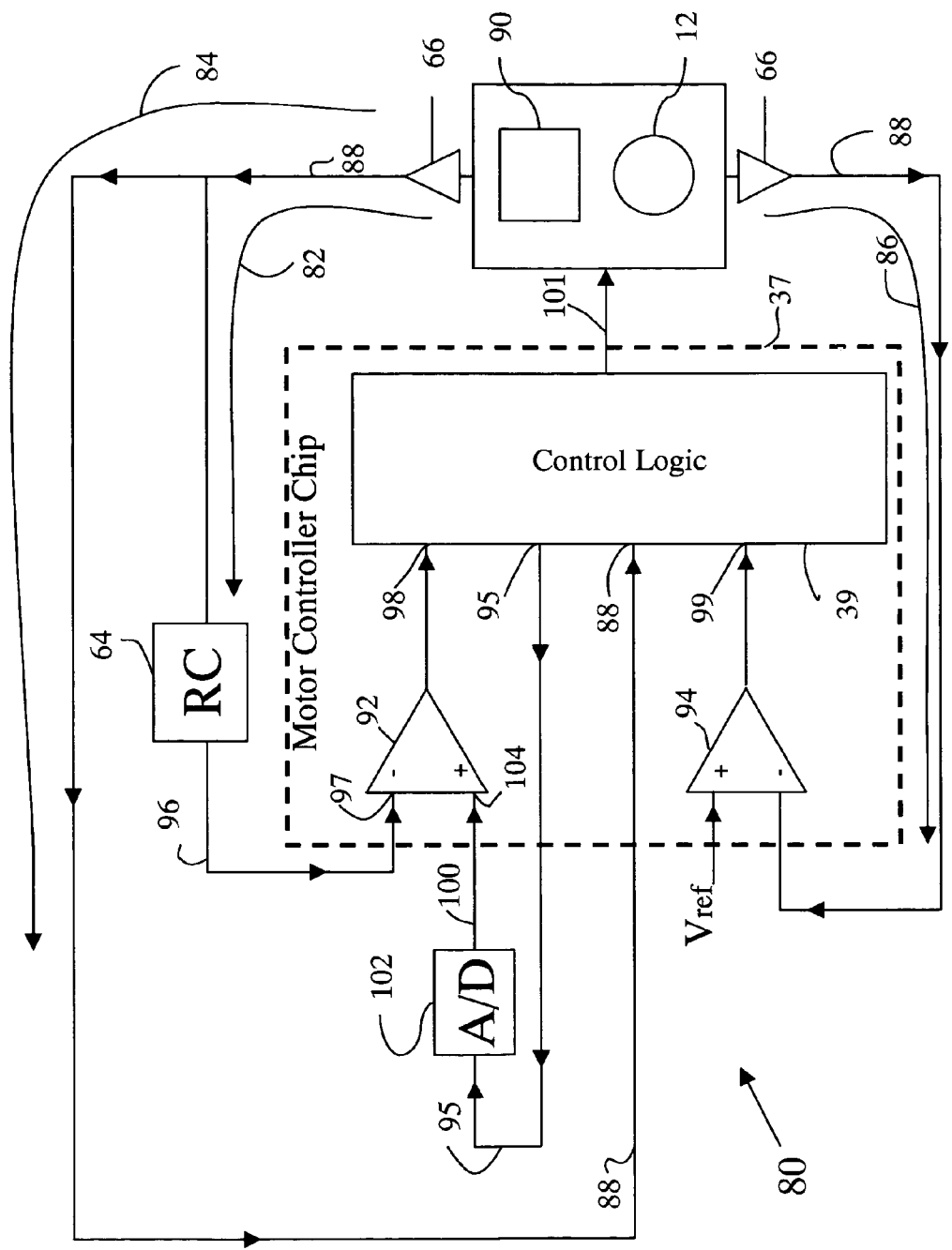
FIG. 13 is a schematic block diagram illustrating a feedback control circuit.

FIGS. 12 and 13 illustrate schematic drawings of a single motor controller circuit 36, which is integrated onto card 32 in accordance with the preferred embodiment. Generally, each motor controller circuit 36 controls an associated brushless motor 12. Motor controller circuit 36 includes a connector 70, a motor controller microprocessor chip 37 connected to feedback loop controller 64 and voltage comparator 66. Connector 70 connects directly to motor 12 or may connect to a motor connector conversion board 110, shown in FIGS. 14-16 and discussed in greater detail below. Conversion board 110 allows card 32 to connect and control a plurality of motors with different configurations chosen from a plurality of different manufacturers.

Motor controller microprocessor chip 37, feedback loop controller 64, and voltage comparator 66 work together to process signals from a Hall-effect sensor 90 to produce an output signal 101 for controlling the speed, direction, and position of brushless motor powered roller 12. Voltage comparator 66 receives a set of signals from Hall-effect sensor 90 of brushless motor 12. Voltage comparator 66 can accommodate Hall-effect signals of motor 12 of a plurality of different configurations from different manufacturers. Hall-effect sensors from most manufacturers generally have a voltage swing from ground to 12 volts. However, some manufacturers may have a different voltage swing range, such as a voltage swing between 6-12 volts. Voltage comparator 66 may be set at an overlap voltage level, such as 7 to 8 volts, to accommodate Hall-effect signals from all types and configurations of motors. Thus, voltage comparator 66 can operate with a plurality of different types and configurations of motorized rollers such as from different manufacturers. Voltage comparator 66 adjusts the Hall-effect signals to a proper level for motor controller chip 37 to process in a set of feedback control loops 80, which are part of motor controller circuit 36 and further described below in the discussion of FIG. 13. Generally, Hall-effect sensors provide a plurality of signals, preferably three signals, which may be processed by motor controller chip 37 to produce a fourth signal calculated from the first three signals. Motor controller chip 37 may be a MC33039 Closed Loop Brushless Motor Adapter manufactured by ON Semiconductor. MC33039 is a high performance closed-loop speed control adapter designed for use in brushless DC motor control systems, which is described in greater detail in a datasheet, Publication Order Number MC33039/D from Semiconductor Components Industries, LLC, the disclosure of which is hereby incorporated herein by reference. The four Hall-effect sensor signals are processed in a series of feedback control loops 80, which is described below and illustrated in FIG. 13, to control the speed, direction, and position of motors 12. Feedback control loops 80 constantly compare signals in order to adjust the speed, direction, and position of motors 12 according to either upper level controller commands or the local motor controller logic in motor controller circuit 36. Motor controller circuit 36 may also include brake control line 68 for controlling a conveyor roller brake. An example of one such conveyor roller brake is disclosed in U.S. Pat. No. 7,021,456 entitled CONVEYOR ROLLER BRAKE, the disclosure of which is hereby incorporated herein by reference.

Feedback control loop circuit 80, in the illustrative embodiment of FIG. 13, includes three control loops: first inner analog control loop 82, second outer digital control loop 84, and third current control loop 86. Control loop circuit 80 controls brushless motor 12 through motor controller chip 37 to control the speed, direction and/or position of the motorized rollers. As is conventional, brushless motor 12 includes a Hall-effect commutator 90 to produce a series of output Hall-effect commutative signals 88. Output Hall-effect commutative signals 88 may include a plurality of pulse width Hall-effect commutator signals. Motor controller chip 37 includes a control logic circuit 39, an operational error amplifier 92 and a current operational amplifier 94 integrated in motor controller chip 37.

First inner control loop 82 is a hardware feedback control loop using a feedback loop controller 64 to maintain the speed of brushless motor 12. Feedback loop controller 64 includes a resistor-capacitor time constant circuit, as is known in the art. The resistor-capacitor time constant circuit of feedback loop controller 64 sets the pulse width of output pulse signal 88. Feedback loop controller 64 detects output Hall-effect commutative signals 88 on every signal transition edge and generates a first analog fixed pulse width signal 96. First analog fixed pulse width signal 96 is received by negative input 97 of error amplifier 92. As motor 12 goes faster, the motor produces pulses at higher frequency and will increase the DC voltage to negative input 97 of error amplifier 92.

Motor controller chip 37 controls second outer digital control loop 84. Motor controller chip 37 receives output Hall-effect commutative signals 88 to derive speed information. Motor controller chip 37 monitors the speed information from Hall-effect commutator 90 and generates a digital signal 95 for the desired speed. Digital signal 95 is converted to speed command signal 100 by serial A/D converter 102. Speed command signal 100 is received by positive input 104 of error amplifier 92.

Error amplifier 92 compares voltages of first analog fixed pulse width signal 96 and speed command signal 100 to send error voltage output 98 to control logic circuit of motor controller 36 to slow down or speed up motor 12 as required to maintain the set speed. Second outer digital control loop 84 controls the overall required speed as dictated by microcontroller 34. First inner analog control loop 82 maintains the required speed of brushless motor 12 as dictated by second outer digital control loop 84.

Third current control loop 86 receives output Hall-effect commutative signals 88 to negative input of current control loop amplifier 94. The positive input of current control loop amplifier 94 is a, for example, 0.1 V internal reference voltage generated by motor controller chip 37. Current control loop amplifier 94 produces current control loop output 99. Current control loop output 99 is received by control logic circuit of motor controller chip 37. Motor controller chip 37 uses output error voltage 98 and current control loop output 99 to determine the proper signal to send to motor 12. Motor controller chip 37 performs iterations to adjust the speed, direction, and position of brushless motor 12. The algorithm or program for controlling brushless motor 12 may be stored in a read/write memory of motor controller chip 37 or in a dedicated RAM device.

The three control loops are processed by motor controller chip 37 to produce a fourth signal, the four control loops control the position, speed and direction of the powered roller by controlling brushless motor 12. Hall-effect sensor 90 in each motor 12 provides precise position information that motor controller chip 37 can use to control motor 12. For example, if there is a requirement to move an item 2.5 feet on the conveying system, motor controller chip 37 may use output Hall-effect commutative signals 88 to activate brushless motor 12 to turn the powered roller for a specific number of revolutions, or portions of a revolution corresponding to a distance of 2.5 feet on the conveying system. Motor controller chip 37 can control partial revolutions of the motorized rollers up to $\frac{1}{100}^{th}$ of a revolution.

Figure 14:
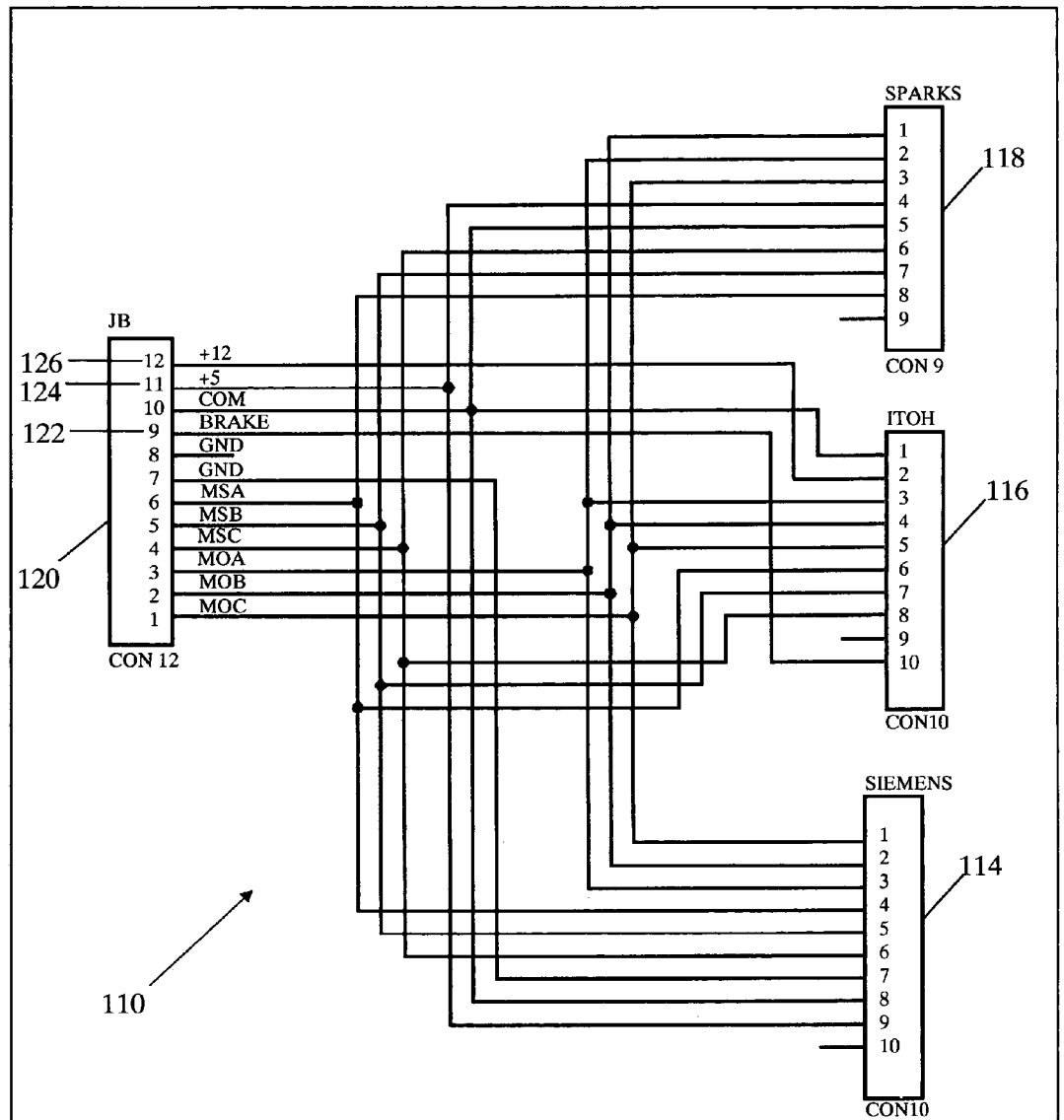
FIG. 14 is a circuit diagram of a motor connector conversion board.
Figures 15, 16:
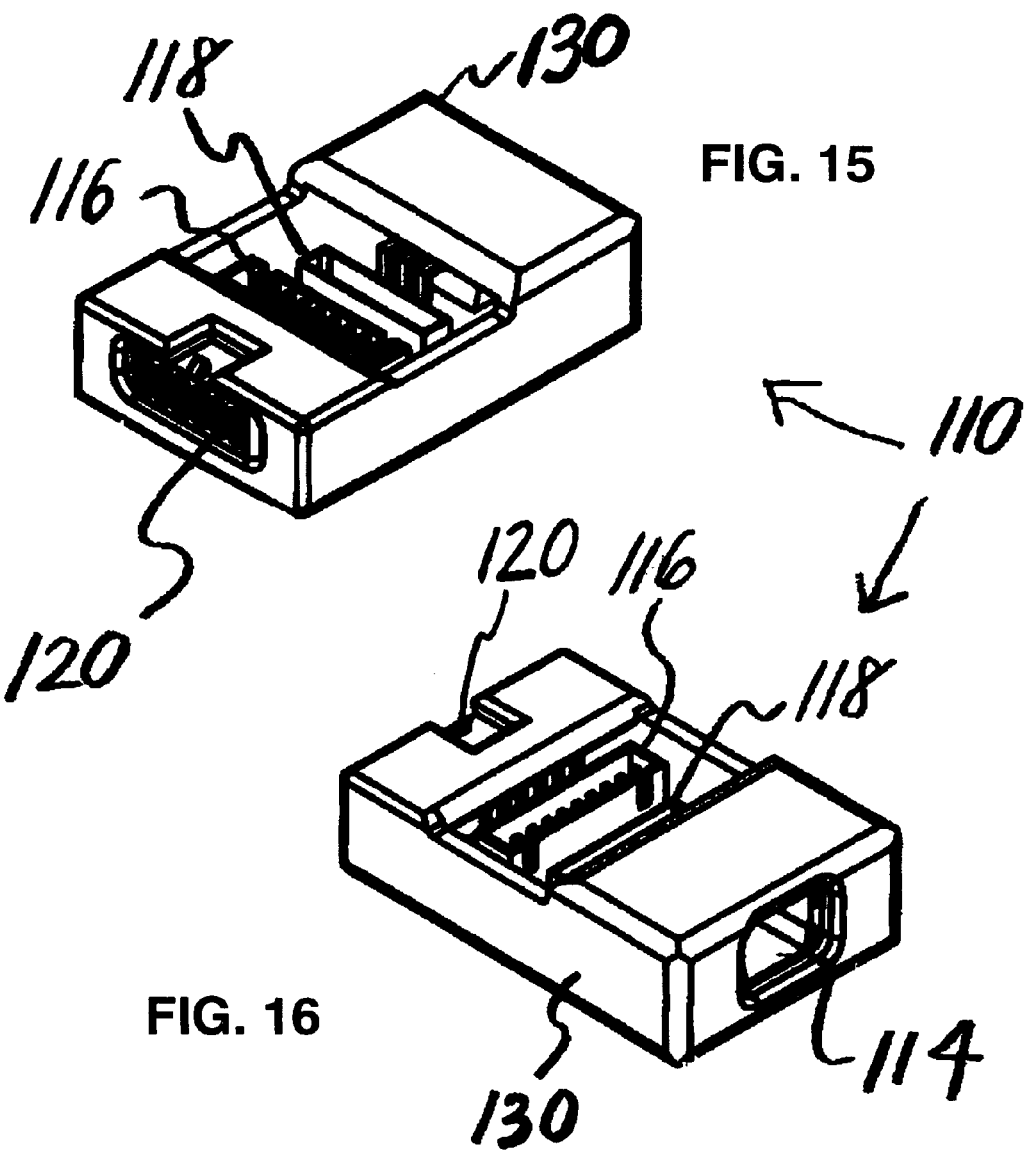
FIG. 15 is a top side perspective view of the motor connector conversion board of FIG. 14.
FIG. 16 is another top side perspective view of the motor connector conversion board of FIG. 14.

A motor connector conversion board 110 acts as a conduit between motor 12 and motor controller 36 of card 32 (FIG. 14). Conversion board 110 enables motor controller 36 to connect to and control one configuration chosen from a plurality of different motor configurations, such as from different manufacturers. Conversion board 110 may include a base board 112 which can be populated with different connectors for different types of roller functions. Base board 112 may include connectors to accommodate the pin connectors of various motor configurations and manufacturers, such as, but not limited to, Siemens motorized rollers 114, Itoh Denki motorized rollers 116, and Sparks motorized rollers 118. This is merely an illustrative list of potential manufacturers and may include more or less manufacturers. A conversion board connector 120 connects with motor controller connector 70 to connect motor 12 with motor controller 36. Conversion board 110 may include a brake roller connection 122 for controlling a brake roller of motor 12. Additionally, power source 50 can provide the proper power requirements to power connections of conversion board 110 to supply power to connected motors according to their specific requirements such as a 5 volt connection 124 or a 12 volt connection 126. FIG. 14 shows three connectors 114, 116, and 118, which are physically different from each other and configured according to the specific mates it connects to, thus helps for error proofing the connections. However, it should be understood that more connectors from other configurations and manufacturers of motors can be added while in keeping with the spirit of the invention. Additionally, conversion board 110 may be integrated onto card 32. Conversion board 110 in a separate housing 130 is illustrated in FIGS. 15 and 16. Housing 130 holds conversion board 110 and enables users to connect card 32 through connectors 120 with the plurality motors of different configurations from different manufacturers through the conversion board. In FIGS. 15 and 16, conversion board 110 provides a connection to accommodate motors from Siemens 114, Itoh Denki 116, and Sparks 118 with conversion board connectors 120 for connection to card connector 70. The connectors for each manufacturer of motors in the illustrative embodiment are physically different from other connectors to prevent an improper connection with conversion board 110. Additionally, each connector is configured differently to accommodate the specific requirements for each motor, for example, the pin outs for the connector is matched with the associated motor from a specific manufacturer.

An embodiment of the invention provides a decrease in the number of wires required for installation and a reduction of the number of hardware parts, specifically motor controllers. An embodiment of the invention may also eliminate the requirement of formatting network protocol for communications.

More specifically, the system integrates the logic controller with the motor controllers for a plurality of zones onto a single card. The card provides all the functionality and features of a conventional system arrangement.

The components and devices may be compactly integrated onto a card with precise and structured coplanar arrangement utilizes all available space on a card. Compact integration exists in the effective utilization of space whereby the plurality of motor controllers connects and communicates directly to the logic controller resulting in a coplanar arrangement and less wiring.

This configuration provides increased portability, reduced manufacturing cost, and reduced installation and set up costs. Changes and modifications in the specifically described embodiment can be carried out without departing from the principles of the invention which is intended to be limited only by the scope of the appended claims, as interpreted according to the principles of patent law.

What is claimed is:

1. A motorized roller integrated control card for use with a material handling system having a conveying surface and a plurality of motorized rollers, said conveying surface defining a plurality of individually controlled zones, at least one of the said motorized rollers propelling said conveying surface at each of said zones, each of said motorized rollers rotating in response to a command signal supplied to that motorized roller and including at least one rotation sensor that produces a rotation signal in response to rotation of that motorized roller, said integrated control card comprising:

a plurality of motor controller circuits each adapted to control one of said motorized rollers;

an upper level control circuit in communication with said plurality of motor controller circuits, said upper level control circuit adapted to communicate with said motor controller circuits for controlling said motorized rollers; and a circuit board, wherein said upper level control circuit and said plurality of motor controller circuits are commonly mounted on said circuit board;

wherein each of said motor controller circuits is adapted to respond to the rotation signal of said one of said motorized rollers and to produce a command signal as a function of the rotation signal, wherein each of said motor controller circuits supplies the command signal to said one of said motorized rollers to rotate that motorized roller, wherein each of said motor controller circuits defines a voltage range and responds to a voltage level of the rotation signal that falls within the voltage range and wherein each of said motor controller circuits is adapted to produce electrical power at a plurality of different voltage levels and to supply electrical power to said one of the motorized rollers at one of the voltage levels, the one of the voltage levels being a function of said one of the motorized rollers connected with that one of said motor controller circuits.

2. The integrated control card of claim 1 wherein each of said motor controller circuits includes a closed loop circuit and a voltage comparator, said voltage comparator converting a rotation signal within the voltage range to another voltage level that is compatible with said closed loop circuit.

3. The integrated control card of claim 2 wherein said voltage range is between approximately 7 volts and approximately 8 volts.

4. The integrated control card of claim 1 wherein each of said motor controller circuits is adapted to respond to a rotation signal produced by a Hall-effect rotation sensor.

5. The integrated control card of claim 1 wherein said upper level control circuit is adapted to control the zones according to a plurality of different modes.

6. The integrated control card of claim 5 wherein said plurality of different modes includes (i) an accumulation mode, (ii) a merge mode, (iii) a divert mode (iv) a transfer mode and (v) a transport mode.

7. The integrated control card of claim 5 including a mode select switch that is adapted to select one of said plurality of modes.

8. The integrated control card of claim 1 including at least one input that is adapted to receive a sensor signal from a product sensor device.

9. The integrated control card of claim 1 wherein each said motor controller circuit is adapted to control the speed, the position, and the direction of the one of said motorized rollers as a function of said rotation signal.

10. A motorized roller integrated control card for use with a material handling system having a conveying surface and a plurality of motorized rollers, said conveying surface defining a plurality of individually controlled zones, at least one of the said motorized rollers propelling said conveying surface at each of said zones, each of said motorized rollers rotating in response to a command signal supplied to that motorized roller and including at least one rotation sensor that produces a rotation signal in response to rotation of that motorized roller, said integrated control card comprising:

a plurality of motor controller circuits, each adapted to control one of said motorized rollers;

an upper level control circuit in communication with said plurality of motor controller circuits, said upper level control circuit adapted to communicate with said motor controller circuits for controlling said motorized rollers; and a circuit board, wherein said upper level control circuit and said plurality of motor controller circuits are commonly mounted on said circuit board;

wherein each of said motor controller circuits is adapted to respond to the rotation signal of said one of said motorized rollers and to produce a command signal as a function of the rotation signal, wherein each of said motor controller circuits supplies the command signal to said one of said motorized rollers to rotate that motorized roller; and a motor connector conversion circuit that is adapted to connect one of said motor controller circuits with said one of said motorized rollers, said motor connector conversion circuit comprising a plurality of electrical connectors having different configurations and a plurality of different electrical interconnections between the one of said motor controller circuits and said electrical connectors, wherein the electrical interconnection between the one of said motor controller circuits and said one of said motorized rollers being a function of which of said electrical connectors is connected with said one of said motorized rollers.

11. The integrated control card of claim 10 wherein each of said motor controller circuits defines a voltage range and responds to a voltage level of the rotation signal that falls within the voltage range and wherein each of said motor controller circuits is adapted to produce electrical power at a plurality of different voltage levels and to supply electrical power to said one of the motorized rollers at one of the voltage levels, the one of the voltage levels being a function of said one of the motorized rollers connected with that one of said motor controller circuits.

12. The integrated control card of claim 11 wherein each of said motor controller circuits includes a closed loop circuit and a voltage comparator, said voltage comparator converting a rotation signal within the voltage range to another voltage level that is compatible with said closed loop circuit.

13. The integrated control card of claim 12 wherein said range is between approximately 7 volts and approximately 8 volts.

14. The integrated control card of claim 10 wherein each of said motor controller circuits is adapted to respond to a rotation signal produced by a Hall-effect rotation sensor.

15. The integrated control card of claim 10 wherein said upper level control circuit is adapted to control the zones according to a plurality of different modes.

16. The integrated control card of claim 15 wherein said plurality of different modes includes (i) an accumulation mode, (ii) a merge mode, (iii) a divert mode (iv) a transfer mode and (v) a transport mode.

17. The integrated control card of claim 15 including a mode select switch that is adapted to select one of said plurality of modes.

18. The integrated control card of claim 10 including at least one input that is adapted to receive a sensor signal from a product sensor device.

19. The integrated control card of claim 10 wherein each said motor controller circuit is adapted to control the speed, the position, and the direction of the one of said motorized rollers as a function of said rotation signal.

20. A material handling system, comprising a conveying surface and a plurality of motorized rollers, said conveying surface defining a plurality of individually controlled zones, at least one of the said motorized rollers propelling said conveying surface at each of said zones, each of said motorized rollers rotating in response to a command signal supplied to that motorized roller and including at least one rotation sensor that produces a rotation signal in response to rotation of that motorized roller; and an integrated control card connected with said motorized rollers, said integrated control card comprising a plurality of motor controller circuits, each adapted to control one of said motorized rollers, an upper level control circuit in communication with said plurality of motor controller circuits for controlling said motorized rollers and a circuit board, wherein said upper level control circuit and said plurality of motor controller circuits are commonly mounted on said circuit board;

wherein each of said motor controller circuits is adapted to respond to the rotation signal of said one of said motorized rollers and to produce a command signal as a function of the rotation signal, wherein each of said motor controller circuits supplies the command signal to said one of said motorized rollers to rotate that motorized roller, wherein each of said motor controller circuits defines a voltage range and responds to a voltage level of the rotation signal that falls within the voltage range, and wherein each of said motor controller circuits is adapted to produce electrical power at a plurality of different voltage levels and to supply electrical power to said one of the motorized rollers at one of the voltage levels, the one of the voltage levels being a function of said one of the motorized rollers connected with that one of said motor controller circuits.

21. A material handling system, comprising a conveying surface and a plurality of motorized rollers, said conveying surface defining a plurality of individually controlled zones, at least one of the said motorized rollers propelling said conveying surface at each of said zones, each of said motorized rollers rotating in response to a command signal supplied to that motorized roller and including at least one rotation sensor that produces a rotation signal in response to rotation of that motorized roller; and an integrated control card connected with said motorized rollers, said integrated control card comprising a plurality of motor controller circuits, each adapted to control one of said motorized rollers, an upper level control circuit in communication with said plurality of motor controller circuits for controlling said motorized rollers and a circuit board, wherein said upper level control circuit and said plurality of motor controller circuits are commonly mounted on said circuit board;

wherein each of said motor controller circuits is adapted to respond to the rotation signal of said one of said motorized rollers and to produce a command signal as a function of the rotation signal, wherein each of said motor controller circuits supplies the command signal to said one of said motorized rollers to rotate that motorized roller;

a motor connector conversion circuit operable for connecting each said motor controller circuit with said one of said motorized rollers, said motor connector conversion circuit comprising a plurality of electrical connectors having different configurations and a plurality of different electrical interconnections between one of said motor controller circuits and said electrical connectors, wherein the electrical interconnection between the one of said motor controller circuits and said one of said motorized rollers being a function of which of said electrical connectors is connected with said one of said motorized rollers.

* * * * *